US012499643B2

(12) United States Patent
Ye et al.

(10) Patent No.: US 12,499,643 B2
(45) Date of Patent: Dec. 16, 2025

(54) GRAPHIC DISPLAY METHOD AND APPARATUS BASED ON VIRTUAL SCENE, DEVICE AND MEDIUM

(71) Applicant: TENCENT TECHNOLOGY (SHENZHEN) COMPANY LIMITED, Shenzhen (CN)

(72) Inventors: Chenghao Ye, Shenzhen (CN); Shengyu Wu, Shenzhen (CN); Shuai Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 232 days.

(21) Appl. No.: 18/350,556

(22) Filed: Jul. 11, 2023

(65) Prior Publication Data
US 2023/0351717 A1    Nov. 2, 2023

Related U.S. Application Data

(63) Continuation of application No. PCT/CN2022/124984, filed on Oct. 12, 2022.

(30) Foreign Application Priority Data

Oct. 29, 2021 (CN) .......................... 202111280250.1
Dec. 31, 2021 (CN) .......................... 202111658265.7

(51) Int. Cl.
*G06T 19/20* (2011.01)
*G06F 3/04817* (2022.01)
(Continued)

(52) U.S. Cl.
CPC .......... *G06T 19/20* (2013.01); *G06F 3/04817* (2013.01); *G06T 3/60* (2013.01);
(Continued)

(58) Field of Classification Search
None
See application file for complete search history.

(56) References Cited

U.S. PATENT DOCUMENTS

2011/0306411 A1   12/2011   Yamada et al.
2020/0206623 A1    7/2020   Nakano et al.
(Continued)

FOREIGN PATENT DOCUMENTS

CN   108619721 A   10/2018
CN   110448905 A   11/2019
(Continued)

OTHER PUBLICATIONS

TheRussianBadger. (Sep. 24, 2017). How to Battle Royale | Fortnite Battle Royale [Video]. Youtube. http://www.youtube.com/watch?v=ELfc6Ckco5U (Year: 2017).*
(Continued)

*Primary Examiner* — Daniel F Hajnik
*Assistant Examiner* — Jed-Justin Imperial
(74) *Attorney, Agent, or Firm* — Anova Law Group, PLLC

(57) ABSTRACT

A graphic display method includes: displaying a view of a virtual scene from a perspective of a first virtual object, the virtual scene comprising a safe region, where a virtual object positioned outside the safe region endures a change of an attribute value; and displaying a region indication graphic based on a current safe region, a target safe region, and a location of the first virtual object, the region indication graphic indicating a relative positional relationship between the first virtual object and the current safe region and a relative positional relationship between the first virtual object and the target safe region, the target safe region being a region that replaces the current safe region in a next region update.

17 Claims, 14 Drawing Sheets

(51) Int. Cl.
  *G06T 3/60*    (2024.01)
  *G06T 7/70*    (2017.01)
  *G06V 10/60*   (2022.01)

(52) U.S. Cl.
  CPC ............... *G06T 7/70* (2017.01); *G06V 10/60* (2022.01); *G06T 2219/2004* (2013.01); *G06T 2219/2016* (2013.01)

(56) References Cited

U.S. PATENT DOCUMENTS

| | | |
|---|---|---|
| 2020/0316470 A1 | 10/2020 | Yang |
| 2020/0376380 A1 | 12/2020 | Abe et al. |
| 2021/0023448 A1 | 1/2021 | Im |
| 2021/0146258 A1 | 5/2021 | Pedersen et al. |
| 2023/0351717 A1 | 11/2023 | Ye et al. |

FOREIGN PATENT DOCUMENTS

| | | |
|---|---|---|
| CN | 112870701 A | 6/2021 |
| CN | 113101657 A | 7/2021 |
| CN | 113262475 A | 8/2021 |
| CN | 114042315 A | 2/2022 |
| JP | 2011255057 A | 12/2011 |
| JP | 2020103798 A | 7/2020 |
| JP | 2020195480 A | 12/2020 |
| JP | 2021515348 A | 6/2021 |
| JP | 2021517841 A | 7/2021 |
| KR | 20200028196 A | 3/2020 |

OTHER PUBLICATIONS

The World Intellectual Property Organization (WIPO) International Search Report for PCT/CN2022/124984 Jan. 9, 2023 6 Pages (including translation).

The Japan Patent Office (JPO) Notice of Reasons for Refusal for Application No. 2023-572531 Nov. 26, 2024 20 Pages (including translation).

"How to view the map PUBG mobile version", AppMedia, Aug. 27, 2018 (Aug. 27, 2018), https://appmedia.jp/pubg/199654.

"Safe Zone of Wilderness Action", Mastering Everything about Wilderness Action, Mar. 1, 2021 (Mar. 1, 2021), https://www.last-dragon.work/kouya/anzentitai.html.

PUBG—Safe zone Explanation, Explains the effects of the Red zones and blue circles displayed on the map, and how the safe zone works. Samurai Gamers, Oct. 17, 2017 (Oct. 17, 2017), https://jp.samurai-gamers.com/pubg/pubg-battlearea/.

The Japan Patent Office (JPO) Notice of Reasons for Refusal for Application No. 2023-572531 May 13, 2025 17 Pages (including translation).

"It's not too late! Explaining the 8 charms of 'CoD Mobile'!", GameWith [online], [Retrieved Apr. 17, 2025], Internet <URL: http://gamewith.jp/gamedb/article/game/show/4075/9219?from=ios>, Oct. 1, 2019.

Call of Duty Warzone (Mar. 11, 2020) (https://www.youtube.com/watch?v=rpEbNghSukc).

Korean Intellectual Property Office (KIPO) Office Action 1 for Application No. 2025-038974374 Apr. 22, 2025 14 Pages (including translation).

\* cited by examiner

GRAPHIC DISPLAY METHOD AND APPARATUS BASED ON VIRTUAL SCENE, DEVICE AND MEDIUM

CROSS-REFERENCES TO RELATED APPLICATIONS

This application is a continuation application of PCT Patent Application No. PCT/CN2022/124984, entitled "VIRTUAL SCENE-BASED GRAPHIC DISPLAY METHOD AND APPARATUS, DEVICE, AND MEDIUM" and filed on Oct. 12, 2022, which claims priority to Chinese Patent Application No. 202111280250.1 entitled "GRAPHIC DISPLAY METHOD AND APPARATUS BASED ON VIRTUAL SCENE, AND DEVICE AND MEDIUM" filed on Oct. 29, 2021 and Chinese Patent Application No. 202111658265.7 entitled "GRAPHIC DISPLAY METHOD AND APPARATUS BASED ON VIRTUAL SCENE, AND DEVICE AND MEDIUM" filed on Dec. 31, 2021, the entire contents of all of which are incorporated herein by reference.

FIELD OF THE TECHNOLOGY

The present disclosure relates to the field of computer technology, and in particular to a graphic display method and apparatus based on a virtual scene, and a device and a medium.

BACKGROUND OF THE DISCLOSURE

With the development of multimedia technology and the diversification of terminal functions, increasing types of games can be played on a terminal. Shooting games are popular among games. In some shooting games, a safe region is refreshed randomly. When a virtual object controlled by a user is positioned inside the safe region, the hit points may decrease only when the virtual object is attacked; when the virtual object is positioned outside the safe region, the hit points may decrease even if the virtual object is not attacked, to encourage the user to control the virtual object to enter the safe region.

SUMMARY

Embodiments of the present disclosure provide a graphic display method and apparatus based on a virtual scene, and a device and a medium, which can improve the efficiency of human-computer interaction. The technical solutions are as follows.

In one aspect, a graphic display method based on a virtual scene is provided and performed by a computer device, the method including: displaying a view of a virtual scene from a perspective of a first virtual object, the virtual scene comprising a safe region, wherein a virtual object positioned outside the safe region endures a change of an attribute value; and displaying a region indication graphic based on a current safe region, a target safe region, and the first virtual object, the region indication graphic indicating a relative positional relationship between the first virtual object and the current safe region and a relative positional relationship between the first virtual object and the target safe region, the target safe region being a region that replaces the current safe region in a next region update.

In one aspect, a graphic display apparatus based on a virtual scene is provided, the apparatus including: a virtual scene display module, configured to display a view of a virtual scene from a perspective of a first virtual object, the virtual scene comprising a safe region, wherein a virtual object positioned outside the safe region endures a change of an attribute value; and a region indication graphic display module, configured to display a region indication graphic based on a current safe region, a target safe region, and the first virtual object, the region indication graphic indicating a relative positional relationship between the first virtual object and the current safe region and a relative positional relationship between the first virtual object and the target safe region, the target safe region being a region that replaces the current safe region in a next region update.

In one aspect, a computer device is provided, the computer device including one or more processors and one or more memories storing at least one computer program therein, the computer program being loaded and executed by the one or more processors to implement the graphic display method based on a virtual scene.

In one aspect, a non-transitory computer-readable storage medium is provided, the computer-readable storage medium storing at least one computer program therein, the computer program being loaded and executed by at least one processor to implement the graphic display method based on a virtual scene.

With the technical solutions provided in the embodiments of the present disclosure, the computer device can display the region indication graphic in the virtual scene based on the current safe region, the safe region to be updated, and the first virtual object, where the region indication graphic can indicate the relative positional relationships between the first virtual object and the two safe regions. The user can know the relative positions between the first virtual object and the two safe regions by viewing the region indication graphic, without viewing the virtual map of the virtual scene, thereby realizing a high efficiency of human-computer interaction.

BRIEF DESCRIPTION OF THE DRAWINGS

In order to illustrate the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Figure 1:
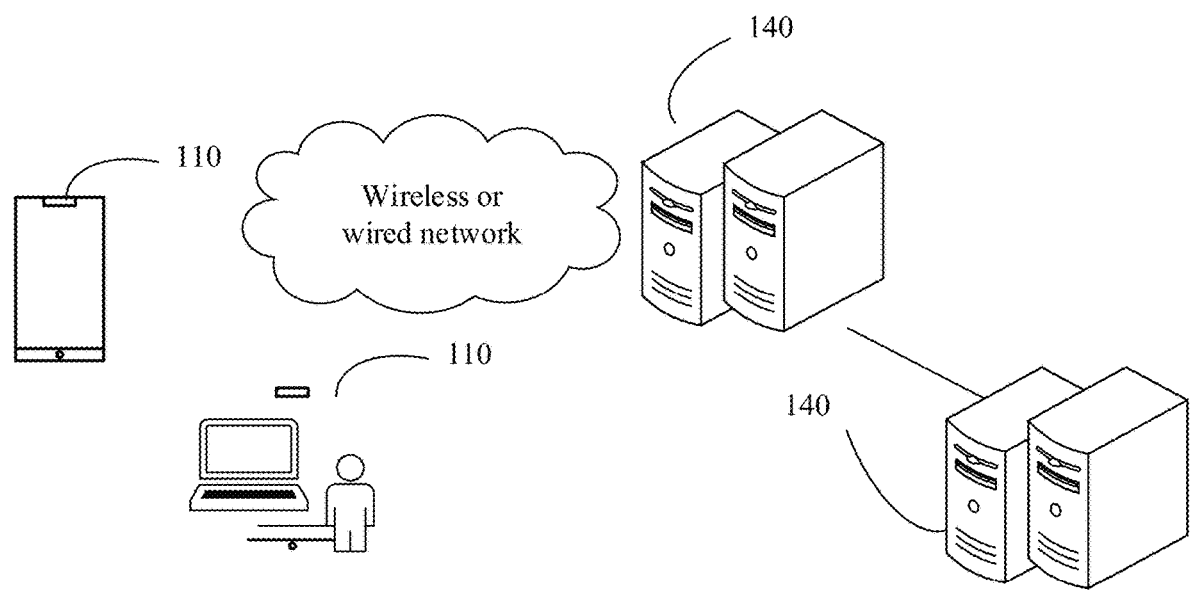
FIG. 1 is a schematic diagram of an implementation environment for a graphic display method based on a virtual scene according to an embodiment of the present disclosure.

In order to make the objectives, technical solutions, and advantages of the present disclosure clearer, the embodiments of the present disclosure will be further detailed below with reference to the accompanying drawings.

In the present disclosure, the terms "first", "second", and the like are used to distinguish the same or similar items with substantially the same effects and functions. It is to be understood that the terms "first", "second", and "$n^{th}$" do not have a logical or chronological dependency, nor do they limit the number or execution order.

In the present disclosure, the term "at least one" means one or more, and "a plurality of" means two or more. For example, a plurality of images means two or more images.

A virtual scene is one that is displayed or provided by an application running on a terminal. The virtual scene may be a real-world simulation environment, a semi-simulation and semi-fictional virtual environment, or a purely fictional virtual environment. The virtual scene may be any of a two-dimensional virtual scene, a 2.5-dimensional virtual scene, or a three-dimensional virtual scene, which is not limited in the embodiments of the present disclosure. For example, the virtual scene may include sky, land, sea, etc. The land may include environmental elements such as a desert, a city, and a user may control a virtual object to move within the virtual scene.

A virtual object refers to a movable object in a virtual scene. The movable object may be a virtual character, a virtual animal, an animated character, and the like, such as a person, an animal, a plant, an oil bucket, a wall, or a stone displayed in the virtual scene. The virtual object may be a virtual avatar in the virtual scene for representing a user. A plurality of virtual objects may be included in the virtual scene, each virtual object having its own shape and dimension in the virtual scene, occupying a part of the space in the virtual scene.

In some embodiments, the virtual object is a user character controlled by operations on a client, an artificial intelligence (AI) set in a virtual battle scene through training, or a non-player character (NPC) set in a virtual scene. In some embodiments, the virtual object is a virtual character competing in a virtual scene. In some embodiments, the number of virtual objects participating in the interaction in the virtual scene is preset or dynamically determined according to the number of clients participating in the interaction.

In a shooting game, for example, a user can control a virtual object to freely fall, glide, or open a parachute in the sky of the virtual scene, and run, jump, crawl, and bend forward on the land, and the user can also control the virtual object to swim, float, or dive in the sea. Of course, the user can also control the virtual object to ride on a virtual carrier to move in the virtual scene. For example, the virtual carrier can be a virtual car, a virtual aircraft, a virtual yacht, etc. The scene above is merely taken as an example, which is not specifically limited in the embodiments of the present disclosure.

FIG. 1 is a schematic diagram of an implementation environment for a graphic display method based on a virtual scene according to an embodiment of the present disclosure. Referring to FIG. 1, the implementation environment includes: a terminal 110 and a server 140.

An application supporting display of a virtual scene is installed and running in the terminal 110. In some embodiments, the application is any of a first-person shooting (FPS) game, a third-person shooting game, a virtual reality application, a three-dimensional map program, or a multi-player gunfight survival game. The terminal 110 is a terminal used by a first user, and the first user uses the terminal 110 to control a controlled virtual object positioned in a virtual scene for activities, including but not limited to: at least one of adjusting body posture, crawling, walking, running, riding, jumping, driving, picking up, shooting, attacking, and throwing. Illustratively, the controlled virtual object is a first virtual character, such as a simulated character or an animated character.

The server 140 is an independent physical server, or a server cluster or distributed system formed by a plurality of physical servers, or a cloud server that provides basic cloud computing services, such as cloud services, cloud databases, cloud computing, cloud functions, cloud storage, network services, cloud communication, middleware services, domain name services, security services, content delivery networks (CDN), big data, and artificial intelligence platforms, and the number and device types of the servers are not specified in the embodiments of the present disclosure. The server 140 provides background services for the application running on the terminal 110, and the terminal 110 is connected to the server 140 via a wireless network or a wired network.

After the foregoing description of the implementation environment of the embodiments of the present disclosure, the application scenario of the embodiments of the present disclosure is described below. In the following description, the terminal is the terminal 110 in the implementation environment above, and the server is the server 140.

Figure 2:
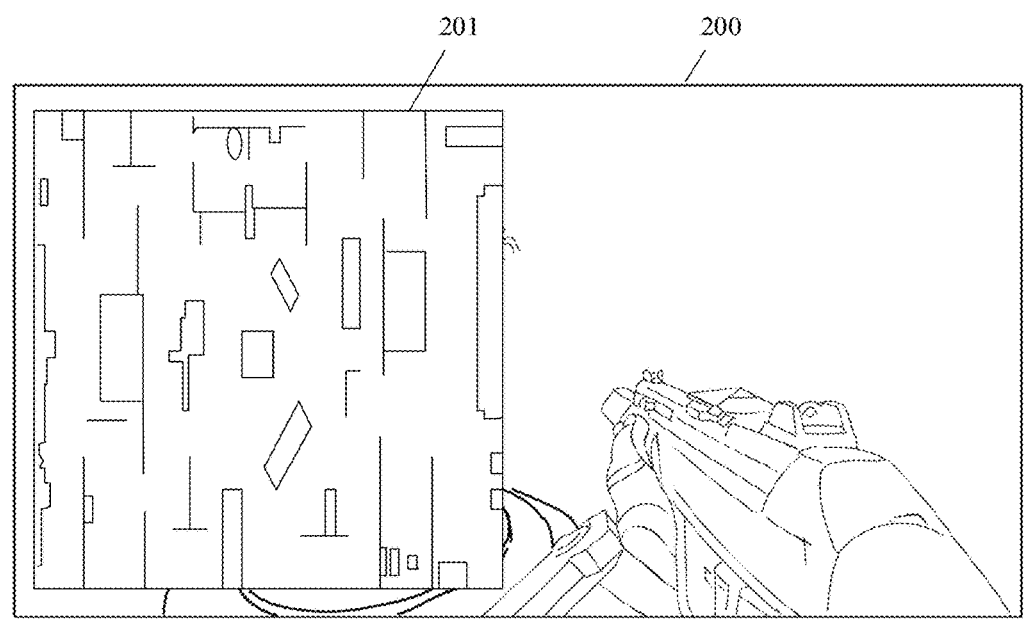
FIG. 2 is an interface diagram including a virtual map according to an embodiment of the present disclosure.

The technical solutions provided in the embodiments of the present disclosure can be applied in a scenario of a shooting game. In the shooting game, the terminal displays a view of a virtual scene from a perspective of a first virtual object, and the user can control the first virtual object to move and attack in the virtual scene through the terminal. The virtual scene may include an entire gaming field where one or more users can control their corresponding virtual objects to move and interact. Different views of the virtual scene may be presented based on movements or interactions made by virtual object(s) that user(s) control. The virtual scene includes a safe region for restricting a moving range of the virtual object, and when the first virtual object moves in the safe region, the hit points do not decrease when not being attacked. When the first virtual object is positioned outside the safe region, the hit points of the first virtual object continue to decrease even if it is not attacked. The safe region is also referred to as a security zone in some embodiments. In the shooting game, the position of the security zone is updated at intervals. For example, an area of the security zone is reduced at intervals, so that virtual objects gather in the security zone, increasing the probability of confrontation between the virtual objects. In the related art, before an update of the security zone, the terminal often displays a prompt message which is used for informing the user of the update of the security zone. The user can determine the position of the security zone to be updated and the distance between the first virtual object and the security zone by viewing the virtual map of the virtual scene. In this process, viewing the virtual map requires the user to perform a corresponding operation, such as clicking a virtual map viewing control. The display of the virtual map will block the display of the virtual scene, and the first virtual object may be attacked by other virtual objects while the user is viewing the virtual map. As shown in FIG. 2, after the user clicks the virtual map viewing control, the terminal displays a virtual map 201 that blocks part of the display of the virtual scene 200. However, with the technical solutions provided in the embodiments of the present disclosure, the terminal can display a region indication graphic based on a safe region, a target safe region, and a first virtual object, where the region indication graphic indicates the relative positional relationships among the safe region, the target safe region, and the first virtual object, where the target safe region is a safe region to be updated. The user can know the relative positional relationship between the first virtual object and the current safe region and the relative positional relationship between the first virtual object and the target display region to be updated by viewing the region indication graphic, and there is no need to view the virtual map of the virtual scene, thereby reducing the operation steps, avoiding the first virtual object from being attacked during viewing the virtual map, and improving the user's game experience while improving the efficiency of human-computer interaction.

The description above is given based on the example that the graphic display method based on a virtual scene provided in the embodiment of the present disclosure is performed by a terminal. Where the shooting game above is a cloud game, the graphic display method based on a virtual scene provided in the embodiment of the present disclosure can also be performed by a server from which a video stream is pushed to and displayed by the terminal, which is not limited in the embodiment of the present disclosure.

Figure 3:
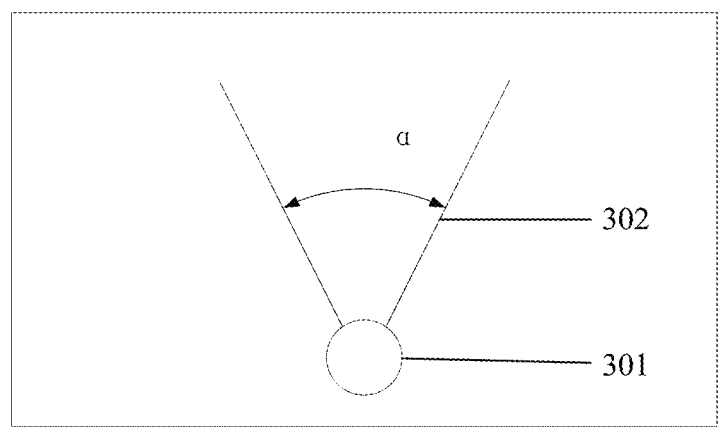
FIG. 3 is an orientation diagram of a virtual object according to an embodiment of the present disclosure.

In order to describe the technical solutions provided in the embodiments of the present disclosure more clearly, the virtual scene in the present disclosure is described below, as shown in FIG. 3. In order to make the shooting game vivid, the game designers may design the display mode of the virtual scene with reference to the way a human observes the real world. The first virtual object 301 can observe a virtual scene in the region 302, and a picture obtained by observing the region 302 from the point of the first virtual object 301 is the displayed virtual scene. The user can adjust the point from which the first virtual object 301 observes the virtual scene by adjusting the orientation of the first virtual object 301.

Figure 4:
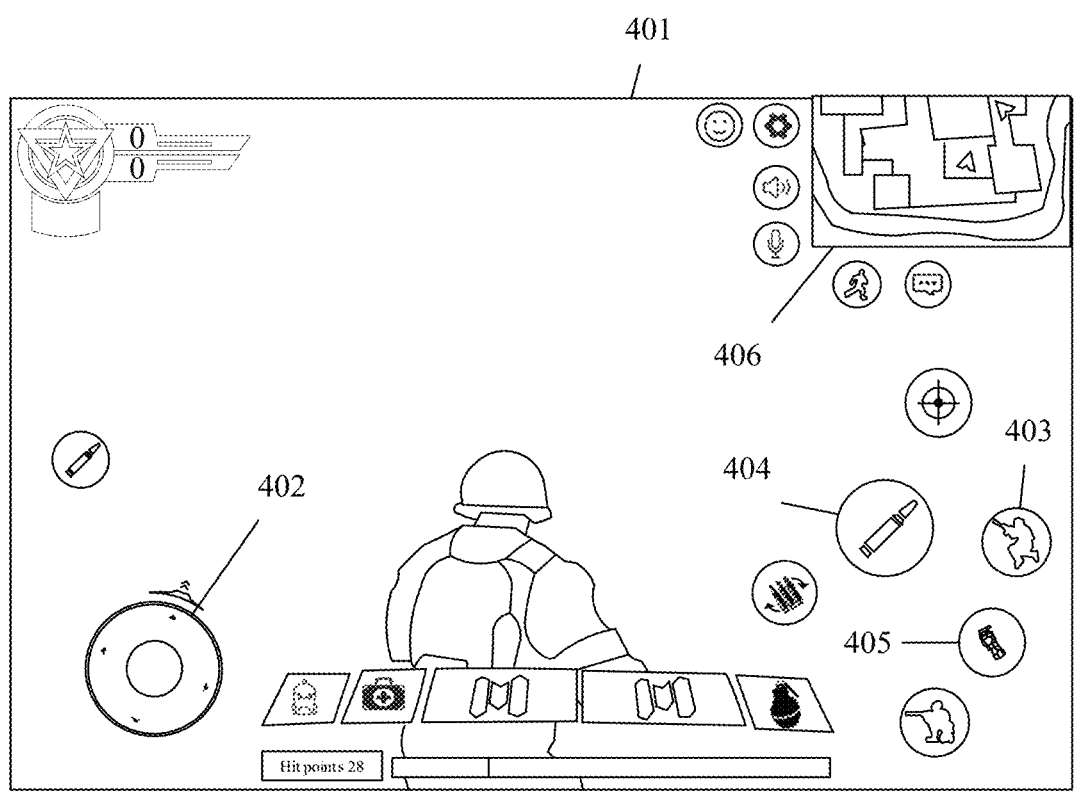
FIG. 4 is an interface diagram according to an embodiment of the present disclosure.

In some embodiments, the virtual scene includes controls for controlling the first virtual object to perform different actions. Referring to FIG. 4, a virtual rocker 402, a posture adjustment control 403, a shooting control 404, and a prop switch control 405 are displayed on the virtual scene 401, where the virtual rocker 402 is used for controlling the motion direction of the first virtual object. The posture adjustment control 403 is used for adjusting the posture of the first virtual object, for example, controlling the virtual object to perform actions such as squatting or crawling. The shooting control 404 is used for controlling a virtual prop held by the first virtual object to launch virtual ammunition. The prop switch control 405 is used for switching the virtual prop held by the virtual object. Also displayed on the virtual scene 401 is a minimap 406, also called a virtual map, through which the user can observe the positions of teammates and enemies in the virtual scene.

Figure 5:
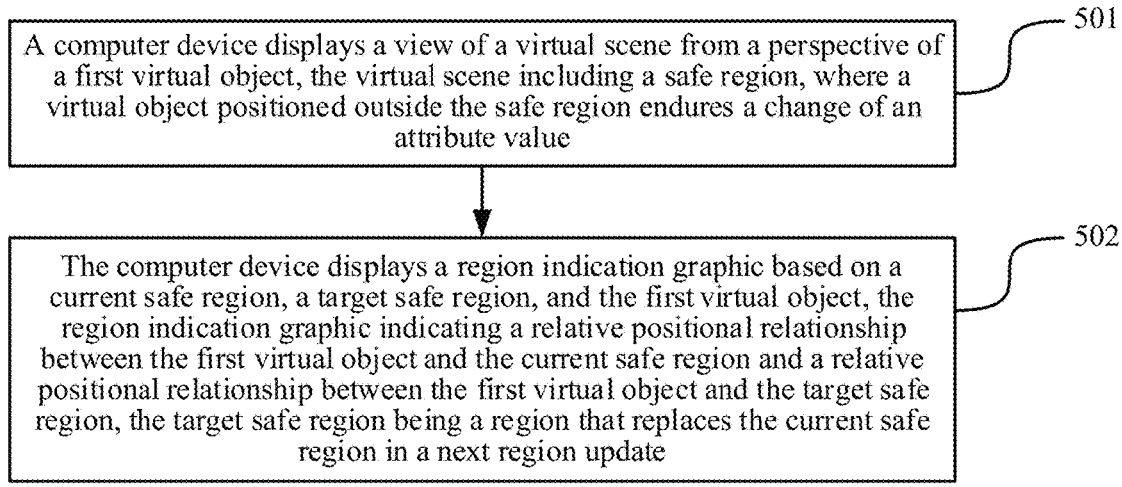
FIG. 5 is a flowchart of a graphic display method based on a virtual scene according to an embodiment of the present disclosure.

After the foregoing description of the implementation environment, the application scenario, and the virtual scene of the embodiments of the present disclosure, the following description will be given on the graphic display method based on a virtual scene provided in the embodiment of the present disclosure, where the executive body is a computer device, e.g., the terminal in the implementation environment shown in FIG. 1 above. With reference to FIG. 5, the method includes the following steps:

501: The computer device displays a view of a virtual scene from a perspective of a first virtual object, the virtual scene including a safe region, where a virtual object positioned outside the safe region endures a change of an attribute value. In some embodiments, a virtual object positioned in the safe region has unchanged attribute values. In some embodiments, a virtual object positioned outside the safe region endures the change of the attribute value when no interactive behavior is received.

The safe region is a region in the virtual scene for restricting the activity range of the virtual object. When the virtual object is positioned inside the safe region, the attribute values will not change without receiving the interactive behavior. Accordingly, when the virtual object is positioned outside the safe region, the attribute values may still decrease without receiving the interactive behavior. The setting of the safe region may prompt the user to control the virtual object to enter the safe region as soon as possible. The safe region in the virtual scene changes at intervals, and the user needs to control the virtual object to enter the new safe region.

502: The computer device displays a region indication graphic based on a current safe region, a target safe region, and the first virtual object (e.g., location and/or orientation of the first virtual object in the virtual scene), the region indication graphic indicating a relative positional relationship between the first virtual object and the current safe region and a relative positional relationship between the first virtual object and the target safe region, the target safe region being a region that replaces the current safe region in a next region update.

The safe region is a current safe region in the virtual scene, and the target safe region is a safe region to be updated in the virtual scene.

In the related art, before refreshing the safe region, the terminal often displays a prompt message, and upon seeing the prompt message, the user can learn the position of the safe region to be refreshed by viewing a virtual map of the virtual scene. However, in this way, the user needs to first open the virtual map when determining the position of the new safe region, resulting in a low efficiency of human-computer interaction.

With the technical solutions provided in the embodiments of the present disclosure, the computer device can display the region indication graphic based on the current safe region, the safe region to be updated, and the first virtual object, where the region indication graphic can indicate the relative positional relationships between the first virtual object and the two safe regions. The user can know the relative positions between the first virtual object and the two safe regions by viewing the region indication graphic, without viewing the virtual map of the virtual scene, thereby realizing a high efficiency of human-computer interaction.

Figure 6:
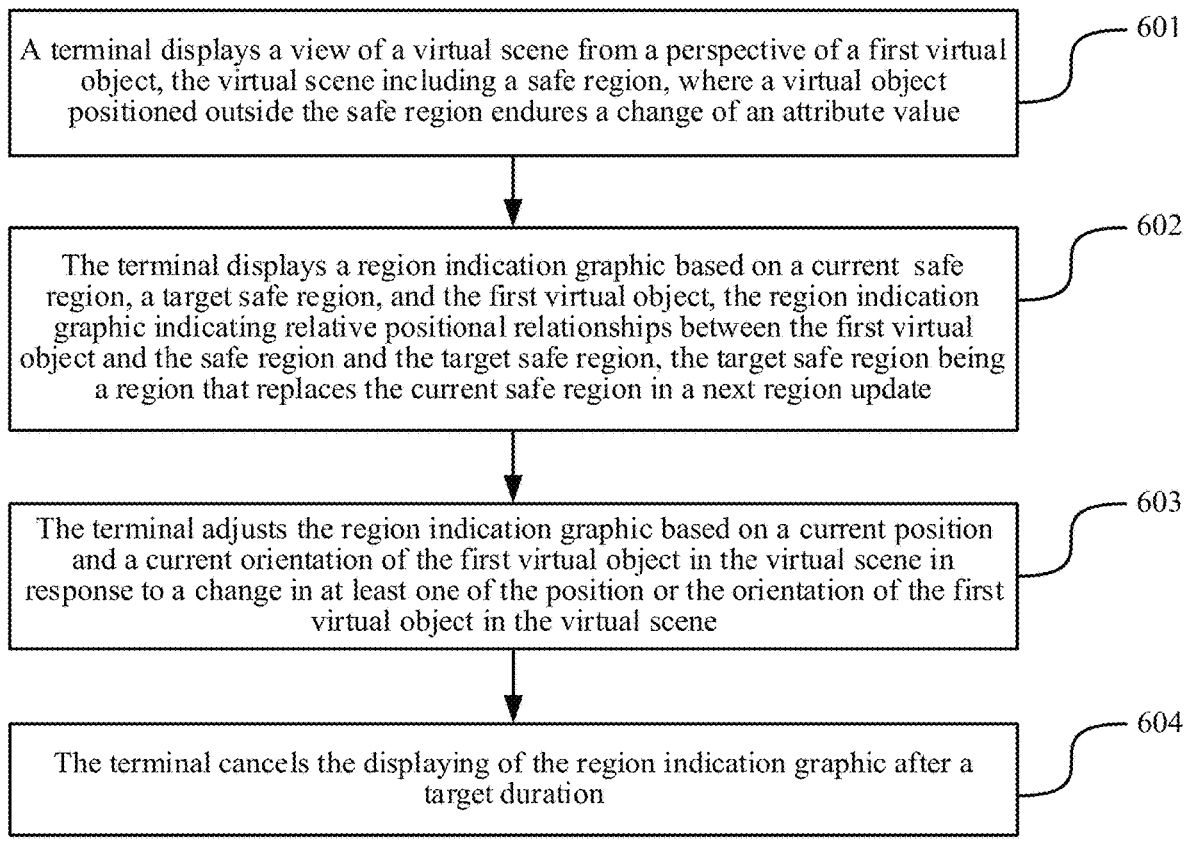
FIG. 6 is a flowchart of a graphic display method based on a virtual scene according to an embodiment of the present disclosure.

Steps 501-502 above form a brief introduction to the graphic display method based on a virtual scene provided in the embodiment of the present disclosure, and the graphic display method based on a virtual scene provided in the embodiment of the present disclosure will be described in more detail below in conjunction with several examples, where the executive body is a computer device, which is exemplified as a terminal in the embodiment of the present disclosure. With reference to FIG. 6, the method includes the following steps:

601: The terminal displays a view of a virtual scene from a perspective of a first virtual object, the virtual scene including a safe region, where a virtual object positioned outside the safe region endures a change of an attribute value.

In some embodiments, the safe region is a randomly generated region in the virtual scene, the safe region serving to restrict the activity range of the virtual object. In some embodiments, the safe region in the virtual scene may be updated. The updating methods of the safe region include continuously reducing the safe region and adjusting the position of the safe region, where there are one or more overlapping portions between the safe regions before and after the adjustment. In some embodiments, there is no safe region in the virtual scene for a period after the start of the game, and the user can control the virtual object to move freely in the virtual scene, such as collecting virtual props and attacking other virtual objects in the virtual scene. After a period, a safe region appears in the virtual scene, and the user controls the virtual object to go to the safe region, so as to avoid the attribute values of the virtual object from decreasing without interaction. In response to that the updating method of the safe region in the virtual scene is to continuously reduce the safe region, when determining the safe region for a first time, the terminal can randomly determine a point in the virtual scene and determine the safe region with the point as the center and a preset length as the radius. In subsequent updates of the safe region, the terminal continuously reduces the radius of the safe region, or randomly generates a target safe region having a smaller area than the safe region within the safe region. In some embodiments, the interactive behavior includes the interactive behavior of other virtual objects to the virtual object in the virtual scene, and also includes the interactive behavior of the virtual scene to the virtual object, where the interactive behavior of other virtual objects to the virtual object includes the other virtual objects attacking the virtual object using a virtual shooter, the other virtual objects attacking the virtual object using a virtual missile, the other virtual objects driving a virtual carrier to hit the virtual object, the other virtual objects summoning a virtual airplane to attack the virtual object in the virtual scene, the other virtual objects attacking the virtual object using a virtual knife, etc. The interactive behavior of the virtual scene to the virtual object includes virtual explosives falling randomly in the virtual scene attacking the virtual object, and the damage caused by the virtual object falling into virtual waters of the virtual scene.

In some embodiments, when the attribute values drop to 0, the virtual object may be eliminated and the user may no longer have control over the virtual object to play. Alternatively, when the attribute values decrease to 0, the virtual object may enter a state of "to be rescued", the user can control the virtual object to "crawl" in the virtual scene, and other users can control virtual objects to rescue the virtual object "to be rescued". If the virtual object "to be rescued" is not rescued by other virtual objects within a period, the virtual object will be eliminated. In some embodiments, the attribute values are hit points of the virtual object, i.e., the hit points of the virtual object do not decrease without receiving an interactive behavior when the virtual object is positioned inside the safe region. When the virtual object is positioned outside the safe region, the hit points of the virtual object may still decrease without receiving the interactive behavior, where the amount of decrease in the hit points is positively related to the duration of the virtual object being positioned outside the safe region. If the virtual object is always positioned outside the safe region, the hit points of the virtual object may decrease to 0, resulting in the virtual object being eliminated.

In some embodiments, the virtual scene is a game scene of a shooting game, the first virtual object is a virtual object controlled by a terminal, and the user can control the first virtual object to move in the virtual scene, use a virtual prop, drive a virtual carrier, and perform other activities through the terminal.

In one embodiment, in response to the user starting a round of game, the terminal displays the virtual scene corresponding to the current round of game, and the first virtual object is displayed in the virtual scene, where a round of game is also a round of shooting, the virtual scene displayed by the terminal is a part of the virtual scene, the first virtual object is displayed in the center of the virtual scene displayed by the terminal, and the virtual scene displayed by the terminal moves as the first virtual object moves. In some embodiments, the virtual scene displayed by the terminal is also referred to as a field of view of the first virtual object. In this case, the terminal can display other virtual objects when they come into the field of view of the first virtual object.

602: The terminal displays a region indication graphic based on a current safe region, a target safe region, and the first virtual object, the region indication graphic indicating relative positional relationships between the first virtual object and the safe region and the target safe region, the target safe region being a region that replaces the current safe region in a next region update.

In one embodiment, the terminal displays the region indication graphic in the virtual scene. In another embodiment, the terminal displays a virtual scene interface, the virtual scene interface displaying a view of the virtual scene from a perspective of the first virtual object, the terminal displaying the region indication graphic in the virtual scene interface, e.g., displaying the region indication graphic in a target region in the virtual scene interface, or the terminal adding a layer to the virtual scene interface and displaying the region indication graphic in the layer.

The safe region is a current safe region in the virtual scene, and the target safe region is a safe region to be updated. In some embodiments, the target safe region is positioned inside the safe region and has a smaller area than the safe region. Alternatively, the target safe region has one or more overlapping portions with the safe region. In response to that the target safe region is positioned inside the safe region and the target safe region has a smaller area than the safe region, the process of the terminal updating the safe region is the process of reducing the safe region. For example, the safe region is a first sphere in a virtual scene, and the edge of the sphere is visible, so the user can know the position of the safe region by viewing the edge. When updating the safe region, the terminal can directly reduce the radius of the sphere to obtain a sphere with a smaller volume, which is the target safe region. Alternatively, the terminal randomly determines a sphere center in the sphere and reduces the radius of the sphere to obtain the target safe region. In response to that the target safe region has overlapping portions with the safe region, the process of the terminal updating the safe region is the process of re-determining the first target safe region around the safe region, where there are overlapping portions between the target safe region and the safe region, so as to ensure that the virtual object can smoothly transfer from the safe region to the target safe region. In some embodiments, the target safe region has a smaller area than the safe region, so as to improve the probability of contact between the virtual objects and reduce the game duration. In some embodiments, the safe region is referred to as a current security zone and the target safe region is referred to as a next security zone.

In one embodiment, the terminal displays the region indication graphic in the virtual scene based on the safe region, the target safe region, and the first virtual object in the virtual scene in response to the time difference from the region update time satisfying a target condition.

The region update time is set by technicians according to actual situations, for example, a fixed duration such as one minute or two minutes, or it is set as a non-fixed duration, for example, three minutes after the start of the game for a first time of region update and five minutes after the start of the game for a second time of region update, which is not limited in the embodiments of the present disclosure. The time difference from the region update time refers to the time difference between the current time point and a time point for a next region update.

In some embodiments, the time difference from the region update time satisfying the target condition means that the time difference from the region update time is less than or equal to a time difference threshold, where the time difference threshold is set by technicians according to actual situations, for example, 5 minutes, 3 minutes, 1 minute, 30 seconds, 10 seconds, or 0 seconds, which is not limited in the embodiments of the present disclosure.

In this embodiment, the terminal can display the region indication graphic before updating the target safe region, which helps attract the attention of the user and improves the efficiency of human-computer interaction.

In one embodiment, the terminal generates a region combination graphic based on the safe region and the target safe region, the region combination graphic indicating a relative positional relationship between the safe region and the target safe region. The terminal displays the region indication graphic in the virtual scene based on the region combination graphic and the first virtual object.

In this embodiment, since the relative positional relationship between the safe region and the target safe region does not change, the terminal can first generate a region combination graphic based on the safe region and the target safe region, and indicate the relative positional relationship between the safe region and the target safe region through the region combination graphic. While the position and orientation of the first virtual object in the virtual scene may change at any time, the relative positional relationships between the first virtual object and the two safe regions may also change at any time, and the use of this constant and changing method to determine the region indication graphic may improve the operation efficiency of the terminal.

In order to explain the embodiment above more clearly, the embodiment above will be explained in two parts.

In the first part, the terminal generates a region combination graphic based on the safe region and the target safe region.

In one embodiment, the terminal generates the region combination graphic based on positions of the safe region and the target safe region in the virtual scene, separately.

In this embodiment, since the relative positional relationship between the safe region and the target safe region does not change, the terminal can directly generate the region combination graphic based on the positions of the safe region and the target safe region, realizing a high efficiency.

For example, the terminal generates the region combination graphic based on a central position and a boundary position of the safe region in a virtual map of the virtual scene and a central position and a boundary position of the target safe region in the virtual map.

The virtual map is a plane projection of the virtual scene, and the virtual map records boundary lines of different regions and names of different regions in the virtual scene.

In some embodiments, the terminal uses coordinates to represent the central positions of the safe region and the target safe region in the virtual map, and uses functions to represent the boundary positions of the safe region and the target safe region in the virtual map. In response to that the safe region and the target safe region are spheres in the virtual scene, the safe region and the target safe region are presented as two circles on the virtual map, where the circles include both perfect circles and ellipses, which is not limited in the embodiments of the present disclosure. In some embodiments, the terminal acquires a center coordinate and a boundary function of the safe region, as well as a center coordinate and a boundary function of the target safe region, and generates a first region graphic based on the center coordinate and the boundary function of the safe region, the first region graphic representing the safe region. The terminal generates a second region graphic in the same coordinate system as the first region graphic based on the center coordinate and the boundary function of the target safe region, the second region graphic representing the target safe region, and a combination of the first graphic region and the second graphic region being the region combination graphic. Of course, the description above is given based on the example that the terminal generates the first region graphic and the second region graphic, separately, and in another embodiment, the terminal can generate the first region graphic and the second region graphic at the same time, which is not limited in the embodiments of the present disclosure.

In some embodiments, the terminal fills a maximum circle in a square of a preset size, the maximum circle representing the safe region, and the circle being taken as the first region graphic. The terminal generates another circle in the square based on the position difference between the central position of the safe region and the central position of the target safe region and a ratio of the radius of the safe region to the radius of the target safe region, the circle representing the target safe region, i.e., the second region graphic, and the combination of the two circles being the region combination graphic, where the preset size is set by technicians according to actual situations, which is not limited in the embodiments of the present disclosure.

In some embodiments, the terminal acquires the center coordinate and the boundary function of the safe region and the center coordinate and the boundary function of the target safe region from the virtual map. The terminal generates the first region graphic on the virtual map based on the center coordinate and the boundary function of the safe region. The terminal generates the second region graphic on the virtual map based on the center coordinate and the boundary function of the target safe region, and the combination of the first region graphic and the second region graphic is the region combination graphic.

Figure 7:
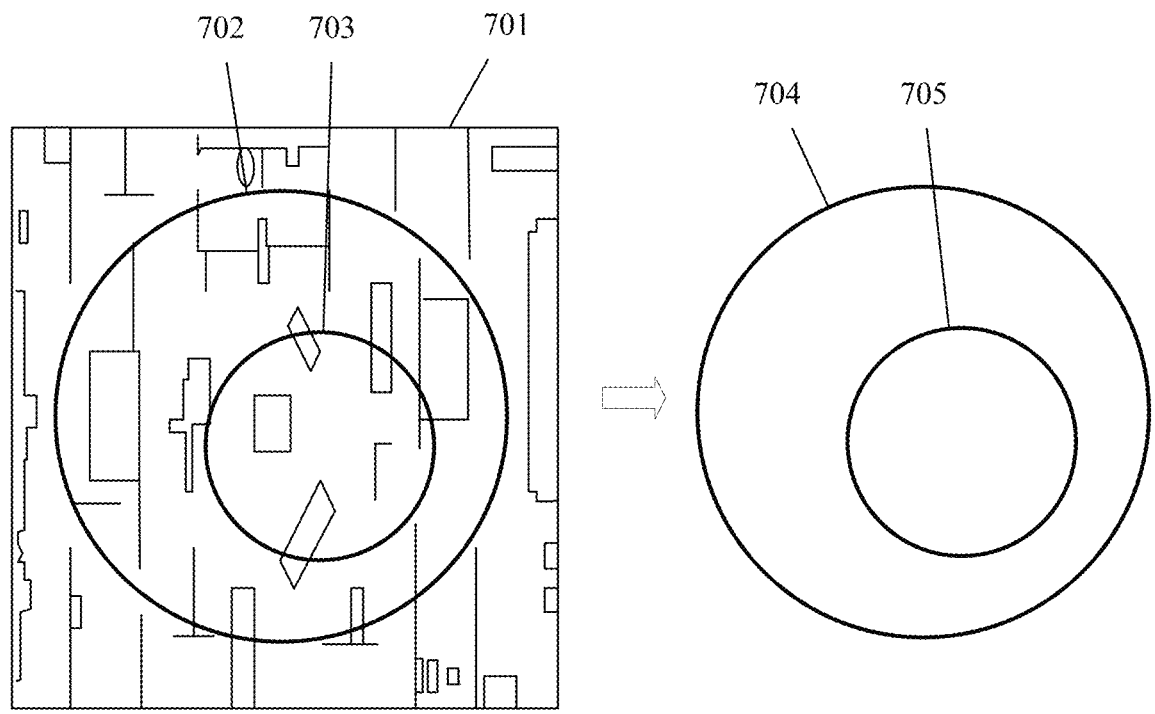
FIG. 7 is a schematic diagram of generating a region combination graphic according to an embodiment of the present disclosure.

Referring to FIG. 7, for example, the terminal acquires the center coordinate and the boundary function of the safe region 702 and center coordinate and the boundary function of the target safe region 703 through the virtual map 701. The terminal generates the first region graphic 704 on the virtual map 701 based on the center coordinate and the boundary function of the safe region 702. The terminal generates the second region graphic 705 on the virtual map 701 based on the center coordinate and the boundary function of the target safe region 703, and the combination of the first region graphic 704 and the second region graphic 705 is the region combination graphic.

In one embodiment, the terminal generates the region combination graphic based on a position of the safe region in the virtual scene, a distance between a central position of the safe region and the first virtual object, and a position of the target safe region in the virtual scene.

In this embodiment, the region combination graphic is generated in consideration of the distance between the central position of the safe region and the first virtual object, so the generated region combination graphic fits the first virtual object.

For example, when the safe region and the target safe region are circles on the virtual map, the terminal generates the first region graphic with the central position of the safe region as a circle center and the distance between the central position of the safe region and the first virtual object as a radius, where the first region graphic represents the distance between the safe region and the first virtual object. The terminal generates the second region graphic with the central position of the target safe region as a circle center and the radius of the target safe region as a radius, where the second region graphic represents the target safe region, and the combination of the first region graphic and the second region graphic is the region combination graphic.

In the second part, the terminal displays the region indication graphic based on the region combination graphic and the first virtual object.

In one embodiment, the terminal adds an oriented icon of the first virtual object to the region combination graphic based on a position and orientation of the first virtual object in the virtual scene to obtain the region indication graphic. The terminal displays the region indication graphic in the virtual scene.

Figure 8:
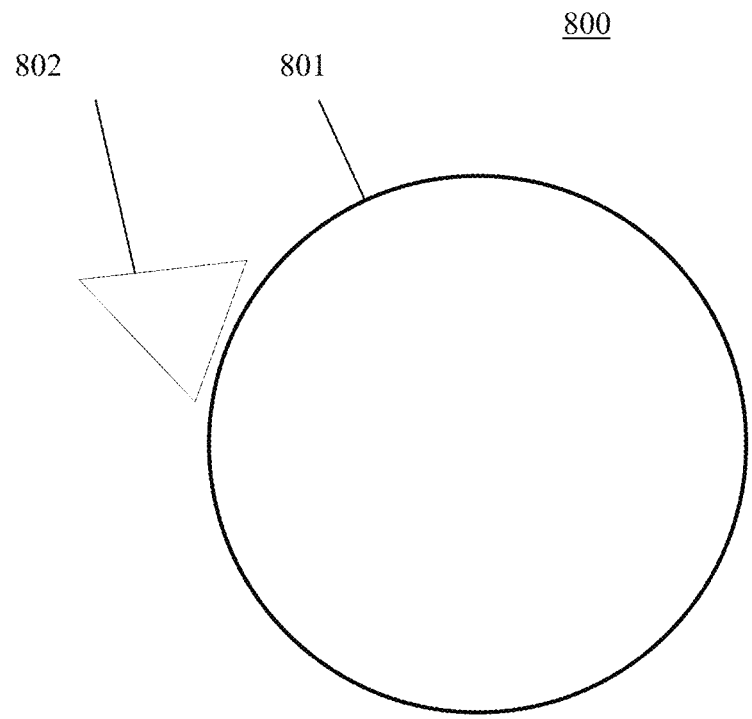
FIG. 8 is a schematic diagram of an oriented icon according to an embodiment of the present disclosure.

The oriented icon indicates the position and direction of the first virtual object in the virtual scene. In some embodiments, the oriented icon is also referred to as "a directed character coordinate icon". FIG. 8 provides an oriented icon 800, where the oriented icon 800 includes a main body 801 and a front point 802, and the direction of the front point 802 represents the orientation of the first virtual object, i.e., where the orientation of the first virtual object changes, the direction of the front point 802 changes accordingly.

In order to explain the embodiment above more clearly, the embodiment above will be explained in two further parts.

(I). The terminal adds an oriented icon of the first virtual object to the region combination graphic based on a position and orientation of the first virtual object in the virtual scene to obtain the region indication graphic.

In one embodiment, in response to that the first virtual object is positioned inside the safe region, the terminal adds the oriented icon inside the region combination graphic based on a distance and position relationship between the first virtual object and the central position of the safe region, and adjusts a pointing direction of the oriented icon to the orientation of the first virtual object, so as to obtain the region indication graphic.

In this embodiment, when the first virtual object is positioned inside the safe region, the terminal can add the oriented icon to the region combination graphic based on the true positional relationship between the first virtual object and the current safe region, so the obtained region indication graphic can truly reflect the position of the first virtual object within the safe region and the relative positional relationship between the first virtual object and the target safe region.

For example, the terminal determines whether the first virtual object is positioned inside the safe region based on the coordinate of the first virtual object in the virtual scene, the center coordinate of the safe region, and the radius of the safe region, i.e., firstly determining the distance between the coordinate of the first virtual object in the virtual scene and the center coordinate of the safe region, and then comparing the distance with the radius of the safe region. The distance being greater than the radius of the safe region represents that the first virtual object is positioned outside the safe region; and the distance being less than or equal to the radius of the safe region represents that the first virtual object is positioned inside the safe region. In response to that the first virtual object is positioned inside the safe region, the terminal determines the position of the first virtual object in the safe region based on the distance between the first virtual object and the central position of the safe region and the relative direction between the first virtual object and the safe region, adds the oriented icon to the corresponding position within the region combination graphic, and adjusts the pointing direction of the oriented icon to the orientation of the first virtual object, so as to obtain the region indication graphic, where the direction of the oriented icon is the orientation of the first virtual object. For example, when the first virtual object is oriented to the central position of the safe region, the oriented icon points to the center of the first region graphic in the region combination graphic, the first region graphic representing the safe region.

In some embodiments, the virtual scene includes a plurality of terrain blocks, and the terminal uses a first numerical value to number the terrain blocks of the plurality of terrain blocks inside the safe region, and uses a second numerical value to number the terrain blocks outside the safe region. When determining whether the first virtual object is positioned in the safe region, the terminal determines the numbering of the terrain block where the first virtual object is positioned; in response to that the numbering of the terrain block is the first numerical value, the terminal determines that the first virtual object is positioned inside the safe region; and in response to that the numbering of the terrain block is the second numerical value, the terminal determines that the first virtual object is positioned outside the safe region. In response to that the first virtual object is positioned inside the safe region, the terminal determines the position of the first virtual object in the safe region based on the distance between the first virtual object and the central position of the safe region and the relative direction between the first virtual object and the safe region, adds the oriented icon to the corresponding position within the region combination graphic, and adjusts the pointing direction of the oriented icon to the orientation of the first virtual object, so as to obtain the region indication graphic.

Figure 9:
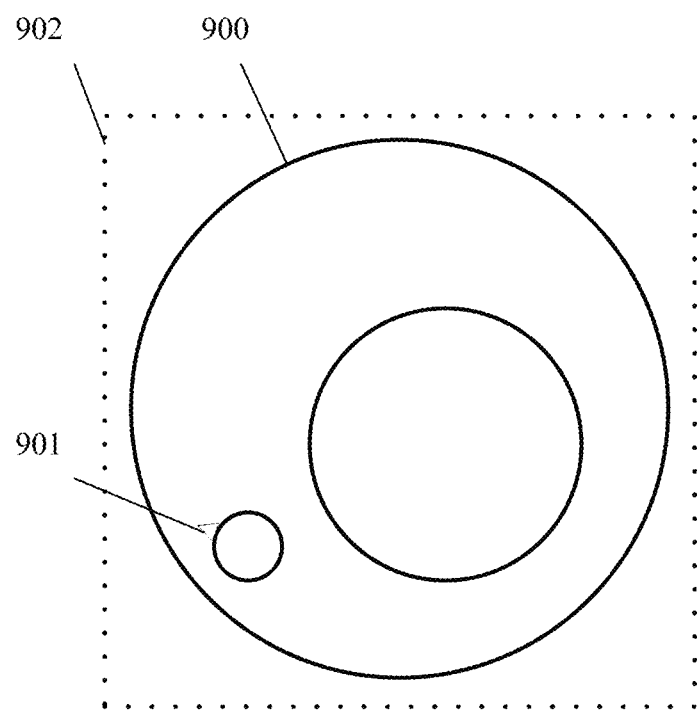
FIG. 9 is a schematic diagram of a region indication graphic according to an embodiment of the present disclosure.

Referring to FIG. 9, for example, in response to that the first virtual object is positioned inside the safe region, the terminal adds the oriented icon 901 to the region combination graphic 900 to obtain the region indication graphic 902.

In one embodiment, in response to that the first virtual object is positioned outside the safe region, the terminal determines a candidate position closest to the first virtual object on the boundary of the safe region in the region combination graphic based on a line between the first virtual object and the central position of the safe region, adds the oriented icon to the candidate position, and adjusts the pointing direction of the oriented icon to the orientation of the first virtual object, so as to obtain the region indication graphic.

In this embodiment, when the first virtual object is positioned outside the safe region, the terminal can add the oriented icon to the boundary of the safe region in the region indication graphic, so that the relative positional relationships between the first virtual object and the two safe regions can be represented by the region indication graphic even if the first virtual object is not within the safe region.

For example, the terminal determines whether the first virtual object is positioned inside the safe region based on the coordinate of the first virtual object in the virtual scene, the center coordinate of the safe region, and the radius of the safe region. In response to that the first virtual object is positioned outside the safe region, the terminal determines the candidate position in the region combination graphic based on the line between the first virtual object and the central position of the safe region, the candidate position being an intersection of the line with the boundary of the first region graphic. The terminal adds the oriented icon to the candidate position and adjusts the pointing direction of the oriented icon to the orientation of the first virtual object, so as to obtain the region indication graphic, where the direction of the oriented icon is the orientation of the first virtual object. For example, when the first virtual object is oriented to the central position of the safe region, the oriented icon points to the center of the first region graphic in the region combination graphic, the first region graphic representing the safe region.

In some embodiments, the virtual scene includes a plurality of terrain blocks, and the terminal may use a first numerical value to number the terrain blocks of the plurality of terrain blocks inside the safe region, and uses a second numerical value to number the terrain blocks outside the safe region. When determining whether the first virtual object is positioned in the safe region, the terminal determines the numbering of the terrain block where the first virtual object is positioned; in response to that the numbering of the terrain block is the second numerical value, the terminal determines that the first virtual object is positioned outside the safe region, and the terminal determines the candidate position in the region combination graphic based on the line between the first virtual object and the central position of the safe region, the candidate position being an intersection of the line with the boundary of the first region graphic. The terminal adds the oriented icon to the candidate position and adjusts the pointing direction of the oriented icon to the orientation of the first virtual object, so as to obtain the region indication graphic.

(II). The terminal displays the region indication graphic.

In one embodiment, the terminal scales the region indication graphic and displays the scaled region indication graphic in the virtual scene.

The scaling ratio of the terminal on the region indication graphic is determined by the area of the region indication graphic and a target area, where the target area is an area of the scaled region indication graphic, and the target area is set by technicians according to actual situations, which is not limited in the embodiments of the present disclosure.

In this embodiment, the region indication graphic is first scaled by the terminal and then displayed in the virtual scene, and the scaled region indication graphic may fit the virtual scene, so as to avoid the region indication graphic being excessively large which may block the virtual scene, and avoid the region indication graphic being excessively small which may disenable a clear view by a user, thereby indicating the relative positional relationships between the first virtual object and the two safe regions by the region indication graphic.

For example, the terminal scales the region indication graphic based on the ratio of the area of the region indication graphic to the target area to obtain the scaled region indication graphic, and the area of the scaled region indication graphic is the target area. The terminal displays the scaled region indication graphic.

Figure 10:
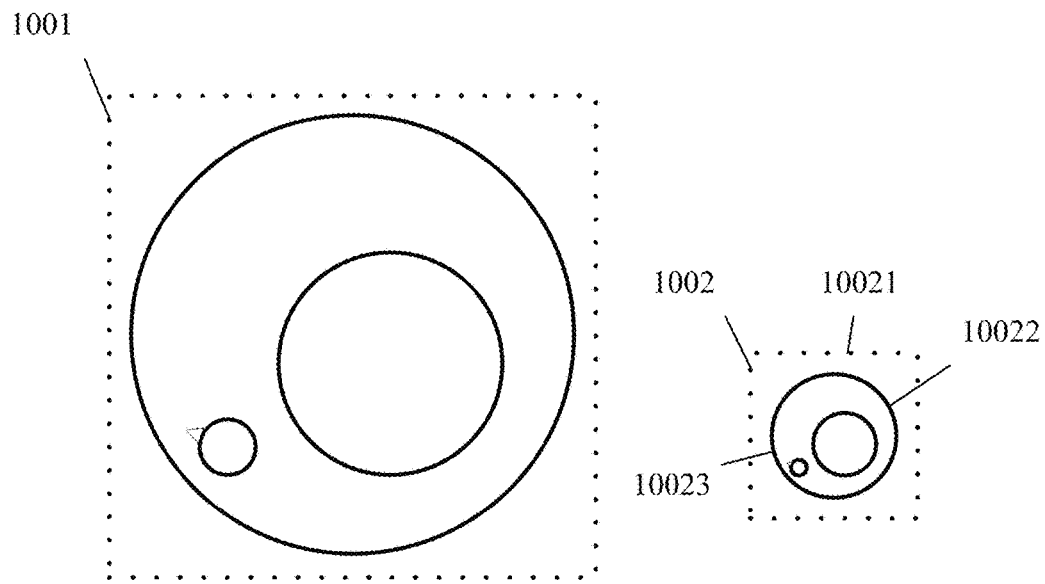
FIG. 10 is a schematic diagram of scaling a region indication graphic according to an embodiment of the present disclosure.
Figure 11:
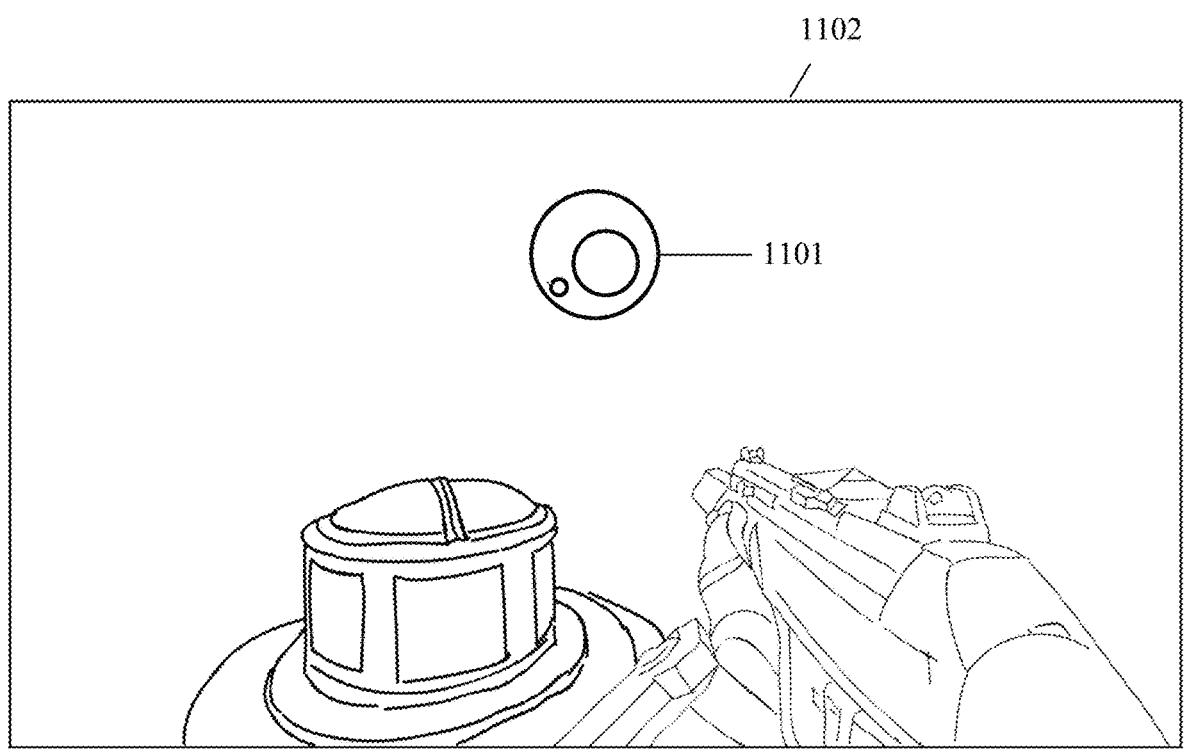
FIG. 11 is an interface diagram including a region indication graphic according to an embodiment of the present disclosure.

Referring to FIG. 10, for example, the terminal scales the region indication graphic 1001 to obtain the scaled region indication graphic 1002, and the terminal displays the scaled region indication graphic 1002 in the virtual scene. In the region indication graphic 1002, the boundary of the maximum circle 10021 represents the boundary of the safe region, the boundary of the small circle 10022 represents the boundary of the target safe region, and the oriented icon 10023 represents the position and orientation of the first virtual object. In some embodiments, the scaled region indication graphic is displayed at a middle-upper position in the virtual scene. Referring to FIG. 11, the terminal displays the scaled region indication graphic 1101 in the virtual scene 1102.

Combining the previous steps, this embodiment may also be described as follows.

1. The region indication graphic appears at a middle-upper position in the virtual scene at the time point of adjusting the safe region.
2. The region indication graphic is formed by three parts, which represent a position of the current safe region, a position of the next safe region (target safe region), and a current position and orientation of the first virtual object.
3. The region indication graphic is generated by the differences of the center coordinates of the three messages above in the virtual map, matching the current position of the first virtual object. The positional relationships and directions among the current safe region, the next safe region, and the current position of the first virtual object coincide with those in the virtual map.
4. The positional relationships among the three coordinates in the region indication graphic are scaled proportionally on the screen and coincide with those in the virtual map.
5. The region indication graphic can graphically prompt the user about the adjustment direction of the safe region, as well as the direction and distance that the first virtual object needs to move.
6. When the region indication graphic appears, the oriented icon in the region indication graphic indicates the position and orientation of the first virtual object, and the oriented icon is a dynamic image which can provide real-time feedback with the user's operation to help the user quickly determine the orientation.

In one embodiment, the terminal rotates the region indication graphic to display the rotated region indication graphic.

In this embodiment, after rotating the region indication graphic, the terminal displays the rotated region indication graphic in the virtual scene, and rotating the region indication graphic by the terminal can make the region indication graphic fit the user's navigation requirements and improve the efficiency of human-computer interaction.

The embodiment above will be explained through two examples.

In Example 1, the terminal rotates the region indication graphic based on a position of the oriented icon on the region indication graphic to position oriented icon at the bottom of the region indication graphic. After the rotation, the relative positional relationships among the three messages in the region indication graphic do not change. For example, the rotated region indication graphic is displayed in the virtual scene.

Rotating the oriented icon to the bottom of the region indication graphic conforms to common navigational display logic and facilitates the user to determine the distance and position relationship between the first virtual object and the two safe regions, thereby realizing a high efficiency of human-computer interaction.

Figure 12:
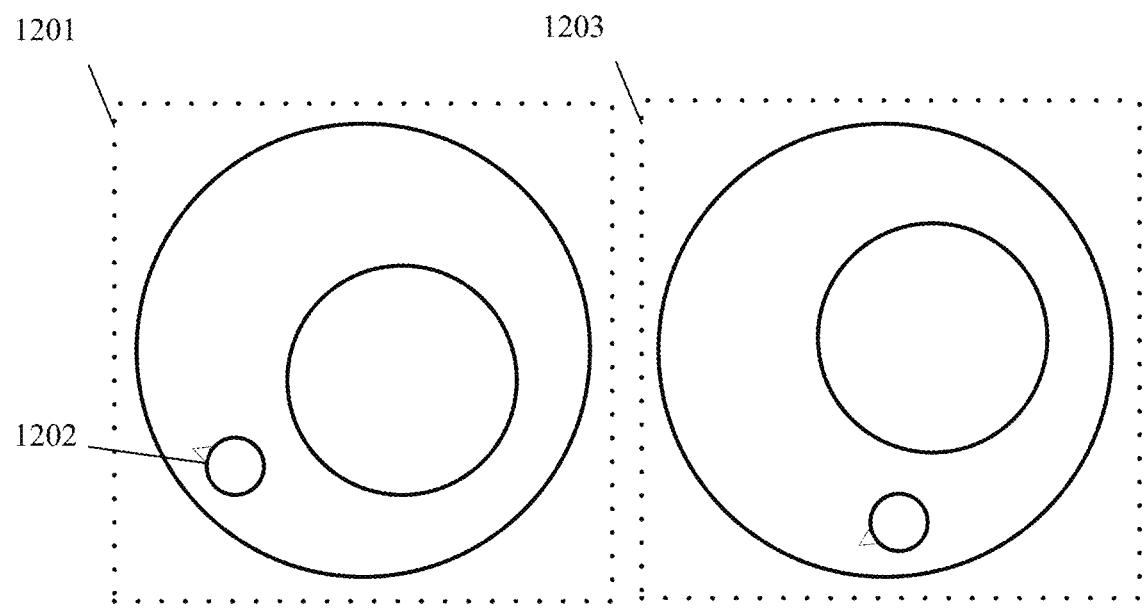
FIG. 12 is a schematic diagram of rotating a region indication graphic according to an embodiment of the present disclosure.

Referring to FIG. 12, for example, the terminal rotates the region indication graphic 1201 and rotates the oriented icon 1202 in the region indication graphic 1201 to the bottom of the region indication graphic 1201 to obtain the rotated region indication graphic 1203, and the terminal displays the rotated region indication graphic 1203 in the virtual scene.

In some embodiments, after obtaining the rotated region indication graphic, the terminal further scales the rotated region indication graphic to obtain a rotated and scaled region indication graphic which is then displayed in the virtual scene.

Figure 13:
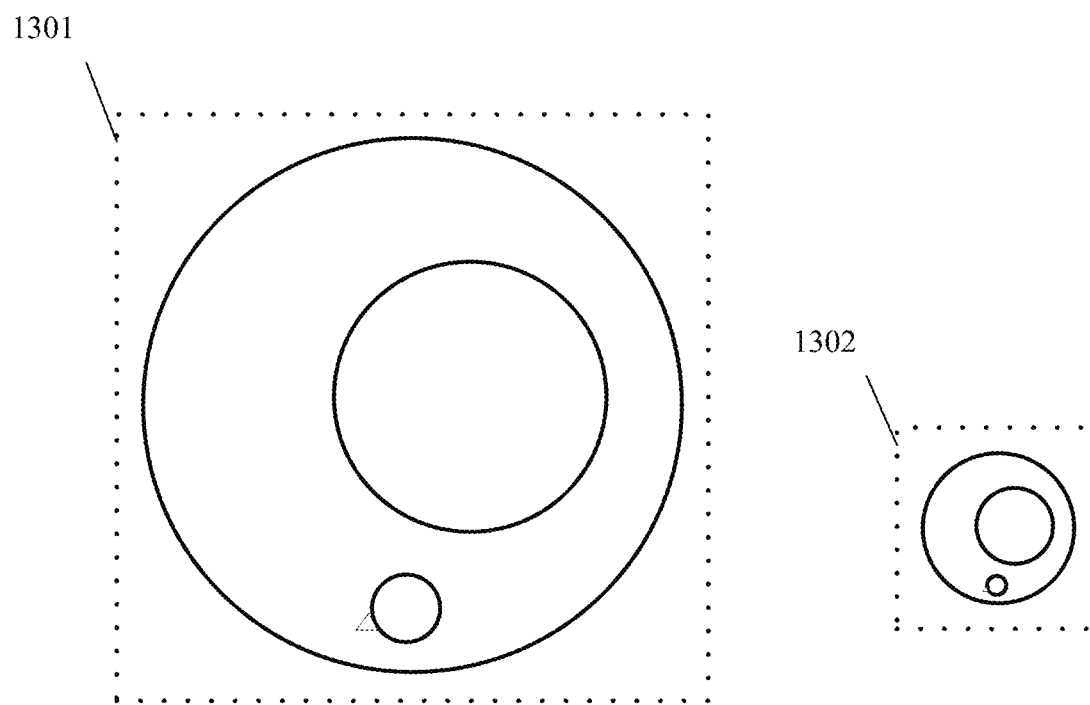
FIG. 13 is a schematic diagram of scaling a region indication graphic according to an embodiment of the present disclosure.
Figure 14:
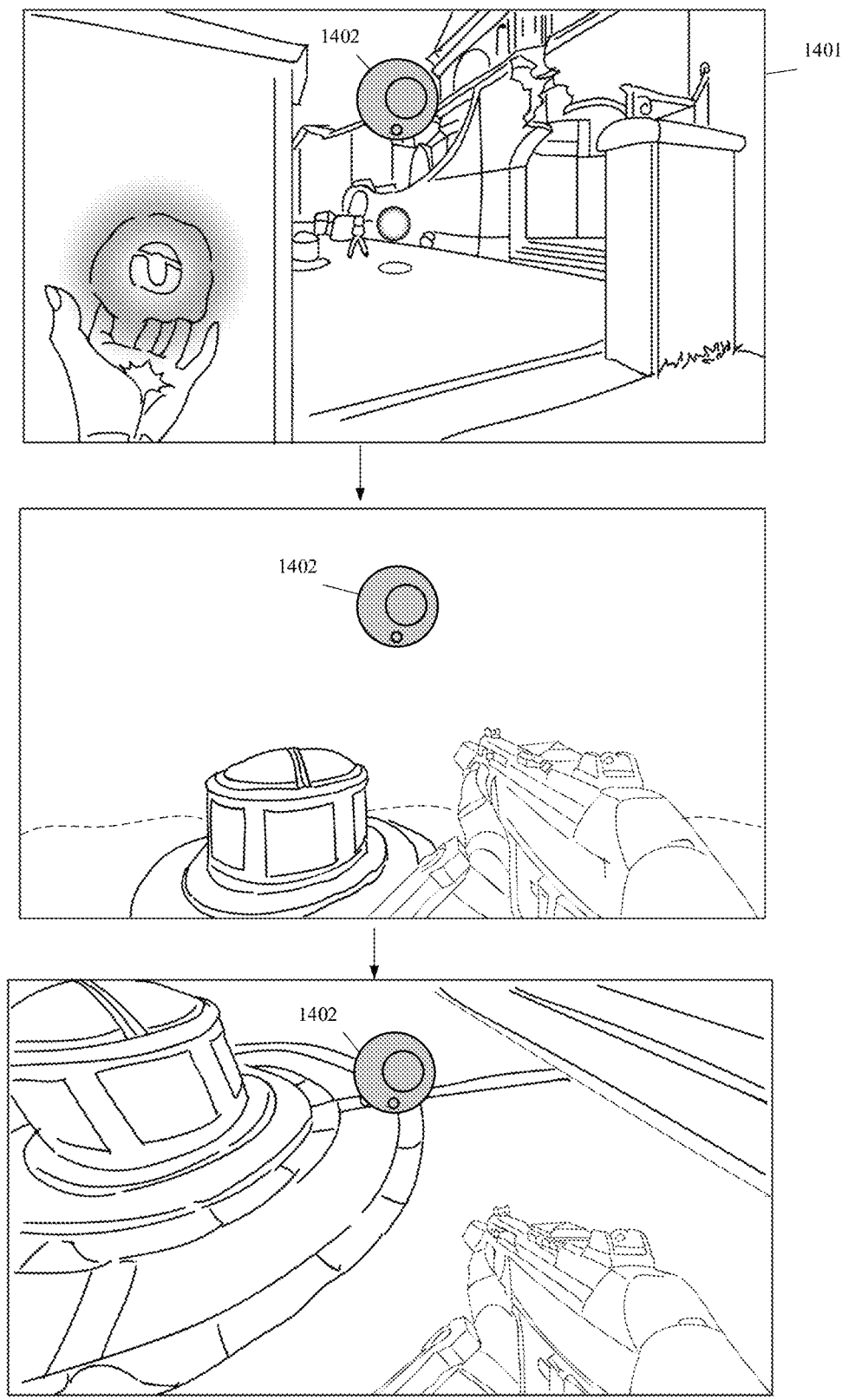
FIG. 14 is an interface diagram including a region indication graphic according to an embodiment of the present disclosure.

For example, the terminal scales the rotated region indication graphic based on the ratio of the area of the region indication graphic to the target area to obtain the rotated and scaled region indication graphic, and the area of the rotated and scaled region indication graphic is the target area. The terminal displays the rotated and scaled region indication graphic in the virtual scene. Referring to FIG. 13, the terminal scales the rotated region indication graphic 1301 to obtain the rotated and scaled region indication graphic 1302, and the terminal displays the rotated and scaled region indication graphic 1302 in the virtual scene. In some embodiments, the rotated and scaled region indication graphic is displayed at a middle-upper position in the virtual scene. Referring to FIG. 14, the terminal displays the rotated and scaled region indication graphic 1402 in the virtual scene 1401. It can be seen from FIG. 14 that the oriented icon is always positioned at the bottom of the region indication graphic 1402 in the region indication graphic 1402 regardless of the orientation of the first virtual object.

Combining the previous steps, this embodiment may also be described as follows.
1. The region indication graphic appears at a middle-upper position in the virtual scene at the time point of adjusting the safe region.
2. The region indication graphic is formed by three parts, which respectively represent a position of the current safe region, a position of the next safe region (target safe region), and a current position and orientation of the first virtual object.
3. The region indication graphic is generated by the differences of the center coordinates of the three messages above in the virtual map, matching the current position of the first virtual object. The positional relationships and directions among the current safe region, the next safe region, and the current position of the first virtual object coincide with those in the virtual map.
4. The region indication graphic can graphically prompt the user about the adjustment direction of the safe region, as well as the direction and distance that the first virtual object needs to move.
5. When the region indication graphic appears, the oriented icon in the region indication graphic indicates the position and orientation of the first virtual object, and the oriented icon is a dynamic image which can provide real-time feedback with the user's operation to help the user quickly determine the orientation.
6. The oriented icon in the region indication graphic indicates the position and orientation of the first virtual object, and the oriented icon is always positioned at the lower half of the vertical diameter of the outer circle of the region indication graphic.

Regardless of the positional relationships among the three messages in the virtual map, the center of the outer safe region is always kept as the center of the region indication graphic in conversion to the region indication graphic, the position of the first virtual object rotationally moves around the center of the outer safe region to the lower half of the vertical diameter of the outer safe region, and the correct position of the next safe region in the region indication graphic is re-corrected according to the positional relationship between the oriented icon of the first virtual object and the center of the safe region at this moment.

In Example 2, the terminal rotates the region indication graphic based on a position and pointing direction of the oriented icon on the region indication graphic, to make a direction of the oriented icon point to a target direction. For example, the rotated region indication graphic is displayed in the virtual scene.

In some embodiments, the target direction is right upwards.

Fixing the pointing direction of the oriented icon facilitates the user to quickly determine the orientation of the first virtual object, thereby realizing a high efficiency of human-computer interaction.

Figure 15:
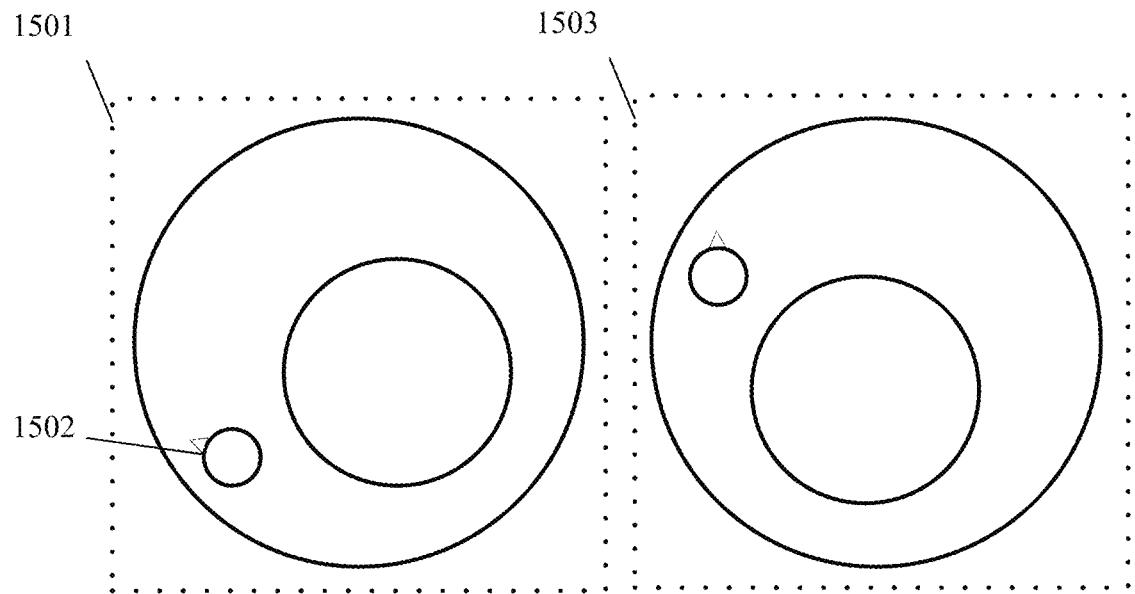
FIG. 15 is a schematic diagram of rotating a region indication graphic according to an embodiment of the present disclosure.

Referring to FIG. 15, for example, the terminal rotates the region indication graphic 1501 and rotates the orientation of the oriented icon 1502 in the region indication graphic 1501 to pointing right upwards to obtain the rotated region indication graphic 1503, and the terminal displays the rotated region indication graphic 1503 in the virtual scene.

In some embodiments, after obtaining the rotated region indication graphic, the terminal further scales the rotated region indication graphic to obtain a rotated and scaled region indication graphic which is then displayed in the virtual scene.

Figure 16:
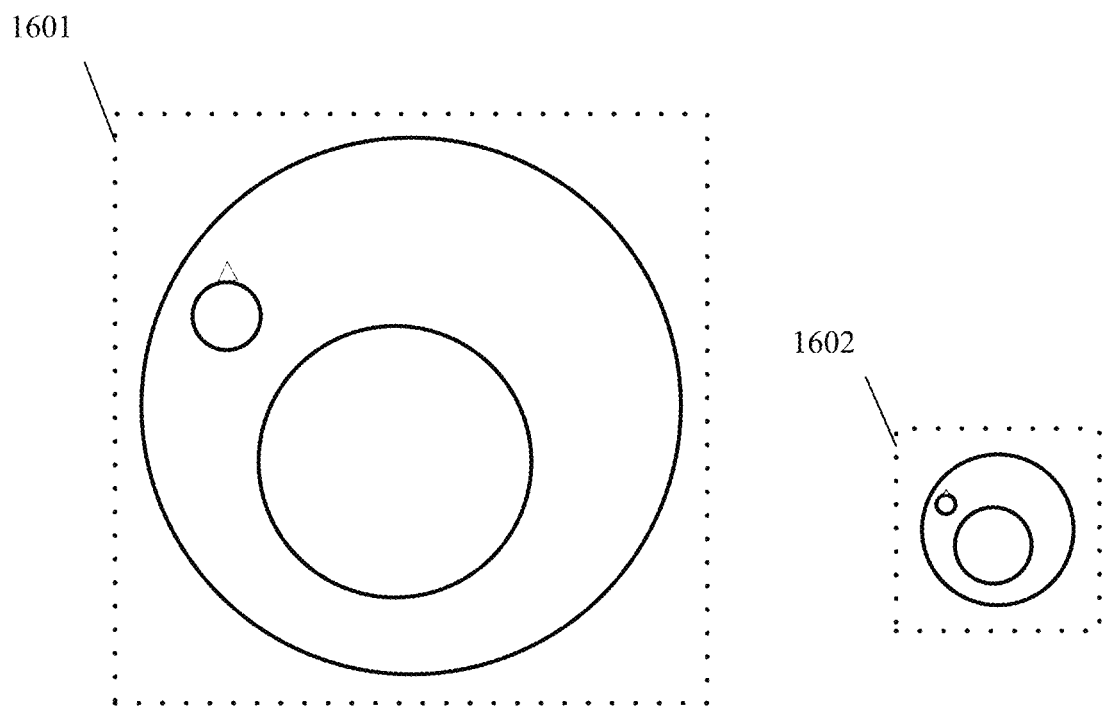
FIG. 16 is a schematic diagram of scaling a region indication graphic according to an embodiment of the present disclosure.
Figure 17:
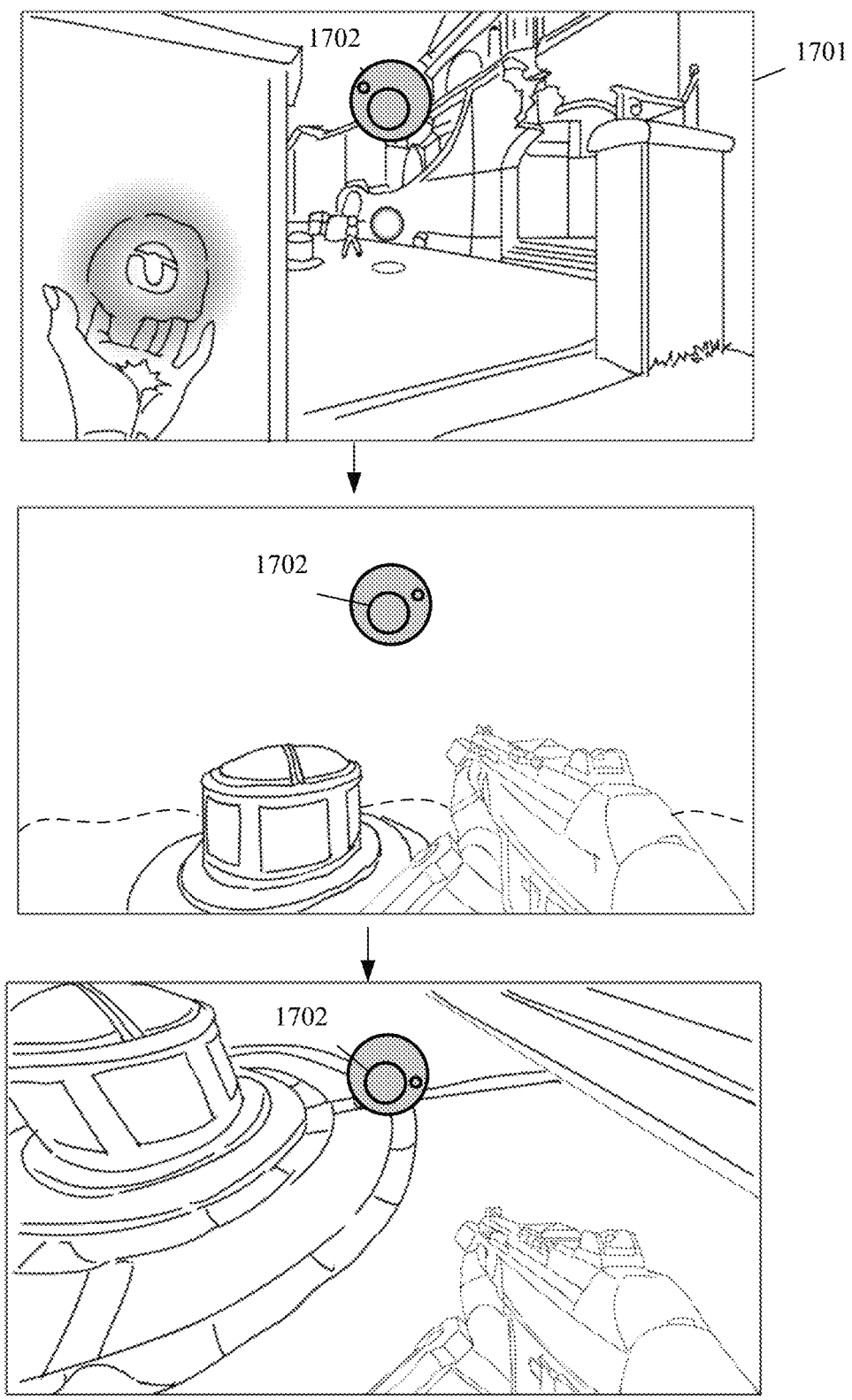
FIG. 17 is an interface diagram including a region indication graphic according to an embodiment of the present disclosure.

For example, the terminal scales the rotated region indication graphic based on the ratio of the area of the region indication graphic to the target area to obtain the rotated and scaled region indication graphic, and the area of the rotated and scaled region indication graphic is the target area. The terminal displays the rotated and scaled region indication graphic in the virtual scene. Referring to FIG. 16, the terminal scales the rotated region indication graphic 1601 to obtain the rotated and scaled region indication graphic 1602, and the terminal displays the rotated and scaled region indication graphic 1602 in the virtual scene. In some embodiments, the rotated and scaled region indication graphic is displayed at a middle-upper position in the virtual scene. Referring to FIG. 17, the terminal displays the rotated and scaled region indication graphic 1702 in the virtual scene 1701. It can be seen from FIG. 17 that the oriented icon always points right upwards in the region indication graphic 1702 regardless of the orientation of the first virtual object.

Combining the previous steps, this embodiment may also be described as follows.
1. The region indication graphic appears at a middle-upper position in the virtual scene at the time point of adjusting the safe region.
2. The region indication graphic is formed by three parts, which respectively represent a position of the current safe region, a position of the next safe region (target safe region), and a current position and orientation of the first virtual object.
3. The region indication graphic is generated by the differences of the center coordinates of the three messages above in the virtual map, matching the current position of the first virtual object. The positional relationships and directions among the current safe region, the next safe region, and the current position of the first virtual object coincide with those in the virtual map.
4. The oriented icon always points right upwards in the region indication graphic. This is used as a fixed reference frame to correct positions of the current safe region and the next safe region in the region indication graphic.
5. When the region indication graphic appears, the position of the safe region in the region indication graphic will rotate as the player's viewing angle changes.

Figure 18:
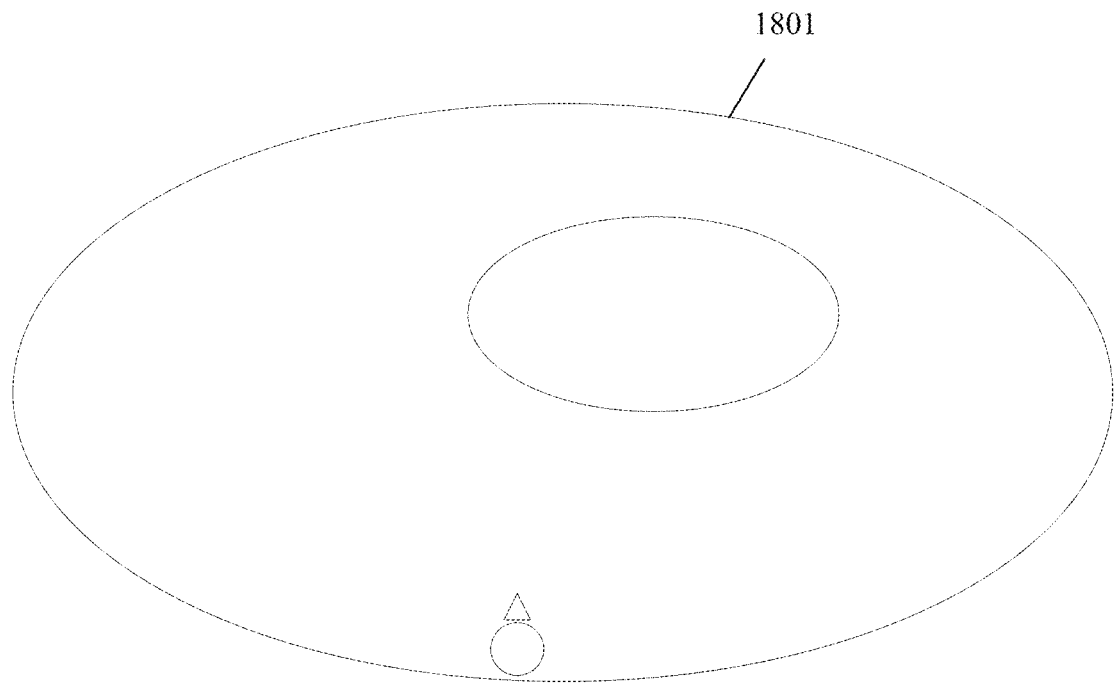
FIG. 18 is a schematic diagram of an oval region indication graphic according to an embodiment of the present disclosure.

In the description above, the region indication graphic is exemplified as a perfect circle. In another embodiment, the region indication graphic may have other shapes, such as an oval shape, which is not limited in the embodiments of the present disclosure. Referring to FIG. 18, the region indication graphic 1801 has an oval shape.

In one embodiment where the region indication graphic includes a first region graphic, a second region graphic, and an oriented icon, the terminal displays the first region graphic, the second region graphic, and the oriented icon in different colors. For example, the first region graphic, the second region graphic, and the oriented icon are displayed in different colors in the virtual scene.

In this embodiment, displaying the first region graphic, the second region graphic, and the oriented icon in different colors facilitates the user to distinguish among them, thereby realizing a high efficiency of human-computer interaction.

For example, the terminal displays the first region graphic in blue, the second region graphic in gray, and the oriented icon in yellow in the virtual scene.

In one embodiment, after or while displaying the region indication graphic, the terminal displays a countdown icon based on the region indication graphic, the countdown icon indicating a remaining time before an update from the safe region to the target safe region. Region updates occur at a certain interval which is set by technicians according to actual situations, such as set as 3 minutes. That is to say, the safe region in the virtual scene is updated every three minutes, and the countdown icon is used for displaying the remaining time before the update from the safe region to the target safe region.

In this embodiment, the terminal can remind the user of the remaining time before the region update time by displaying the countdown icon, i.e., remind the user of the remaining time before the update from the current safe region to the target safe region, so that the user can control the first virtual object to move to the target safe region in time, thereby realizing a high efficiency of human-computer interaction.

The embodiment above will be explained through two examples.

In Example 1, the terminal displays the countdown icon below the region indication graphic.

Figure 19:
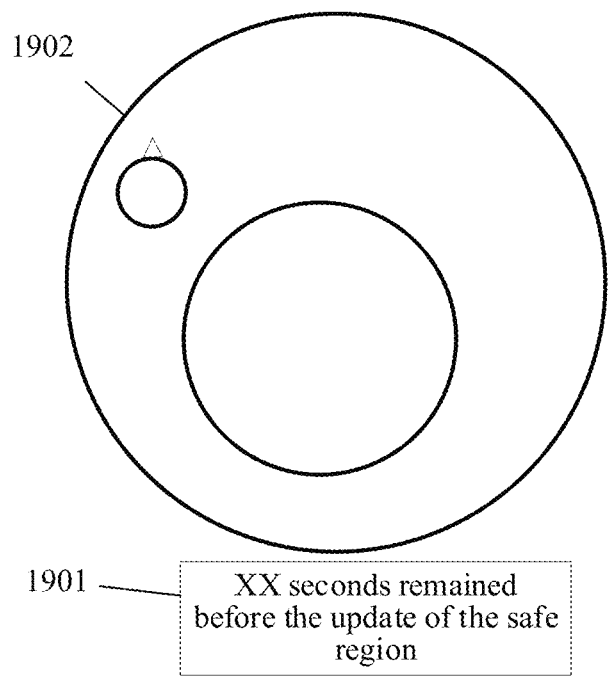
FIG. 19 is a schematic diagram of a display position of a countdown icon according to an embodiment of the present disclosure.

Referring to FIG. 19, for example, the terminal displays the countdown icon 1901 below the region indication graphic 1902.

In Example 2, in response to that the region indication graphic includes an oriented icon, the terminal displays the countdown icon below the oriented icon, the oriented icon indicating the position and orientation of the first virtual object in the virtual scene.

Figure 20:
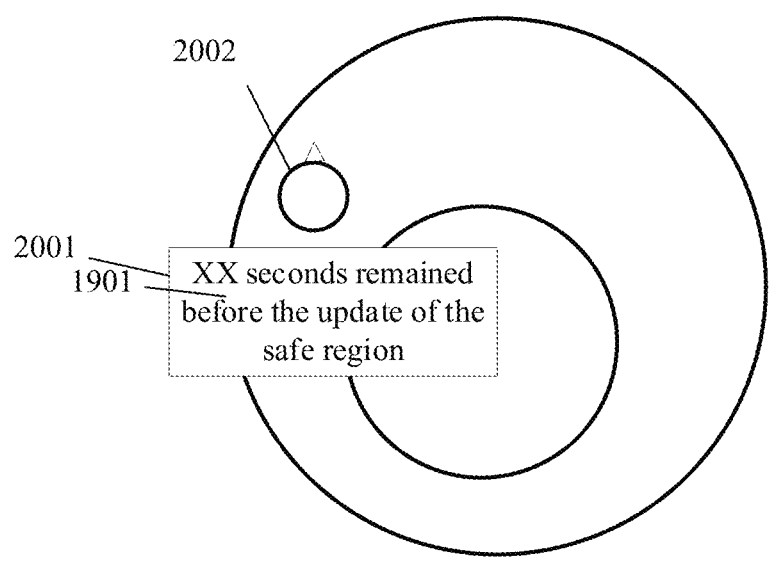
FIG. 20 is a schematic diagram of a display position of a countdown icon according to an embodiment of the present disclosure.

Referring to FIG. 20, for example, the terminal displays the countdown icon 2001 below the oriented icon 2002.

In one embodiment, after or while displaying the region indication graphic, the terminal may further perform the following steps.

In response to that the first virtual object is positioned inside the safe region, the terminal displays a distance between the first virtual object and the target safe region in the region indication graphic.

In this embodiment, the terminal provides the user with the distance between the first virtual object and the target safe region, helping the user know how far the current first virtual object is from the target safe region, so as to remind the user to control the first virtual object to move to the target safe region and improve the efficiency of human-computer interaction.

In response to that the first virtual object is positioned outside the safe region, the terminal displays a distance between the first virtual object and the safe region and the distance between the first virtual object and the target safe region in the region indication graphic.

In this embodiment, the terminal provides the user with the distance between the first virtual object and the safe region and the distance before the first virtual object and the target safe region, helping the user know how far the current first virtual object is from the safe region or the target safe region, so as to remind the user to control the first virtual object to move to the safe region or the target safe region and improve the efficiency of human-computer interaction.

603: The terminal adjusts the region indication graphic based on a current position and a current orientation of the first virtual object in the virtual scene in response to a change in at least one of the position or orientation of the first virtual object in the virtual scene.

In one embodiment, the terminal adjusts the region indication graphic based on the current position and orientation of the first virtual object in the virtual scene, the safe region, and the target safe region in response to the change in any of the position and orientation of the first virtual object in the virtual scene.

The technical solution described in the embodiment above falls within the same inventive concept as the method for the terminal to display a region indication graphic in the virtual scene based on the safe region, the target safe region, and the first virtual object in the virtual scene in step 602 described above, and the implementation process may be found in the description above and will not be detailed herein.

Through step 603, the terminal can adjust the region indication graphic in time when the position or orientation of the first virtual object changes, and the user can know the relative positional relationships between the first virtual object and the two safe regions in real time through the region indication graphic adjusted in real time, thereby realizing a high efficiency of human-computer interaction.

604: The terminal cancels the displaying of the region indication graphic after a target duration.

The target duration may be set by game technicians or preset in game configurations according to actual situations, for example, 6 seconds, 8 seconds, or 10 seconds, which is not limited in the embodiments of the present disclosure.

Through step 604, the terminal can cancel the displaying of the region indication graphic after a period, thereby providing the user with more space to view the virtual scene.

In some embodiments, the region indication graphic includes a close control, and the terminal cancels the displaying of the region indication graphic in response to a click on the close control. In this embodiment, the user can control the terminal to cancel the displaying of the region indication graphic at any time as needed, providing the user with higher autonomy.

In some embodiments, a calling control of the region indication graphic is displayed in the virtual scene, and after the terminal cancels the displaying of the region indication graphic, the terminal may re-display the region indication graphic in response to a click on the calling control.

Other embodiments of the present disclosure may be formed by using different combination of one or more the foregoing example technical solutions, and details are not described herein.

In steps 601-604 described above, the executive body is exemplified as a terminal. In another embodiment, the data processing part in steps 601-604 is executed by a cloud game server in a cloud game scene, and the terminal functions to receive operations and display, which is not limited in the embodiments of the present disclosure.

Figure 21:
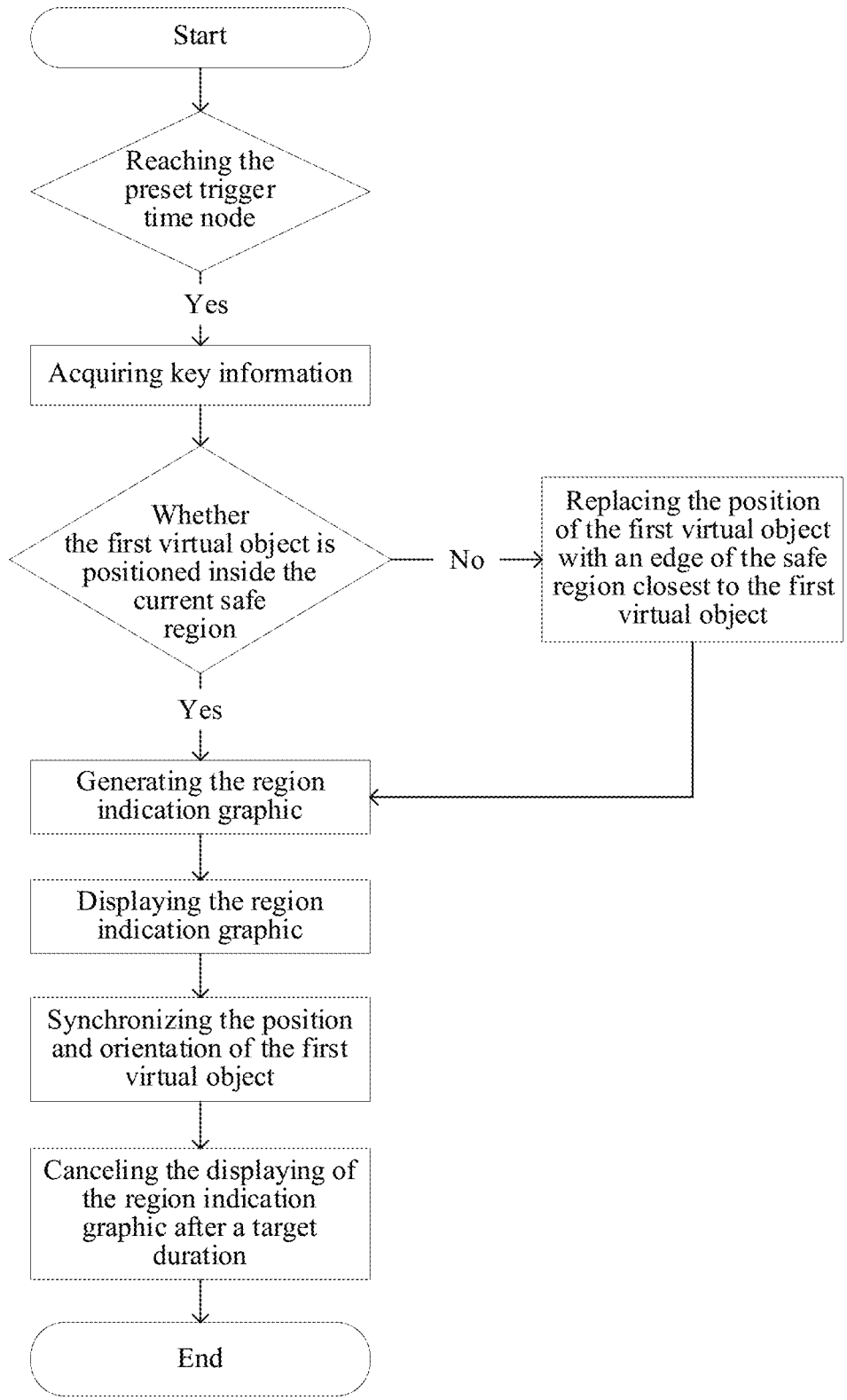
FIG. 21 is a logical block diagram of a graphic display method based on a virtual scene according to an embodiment of the present disclosure.

The graphic display method based on a virtual scene provided in an embodiment of the present disclosure will be described below in conjunction with FIG. 21 and the example embodiments above. With reference to FIG. 21, the method includes the following steps. When a preset trigger time node is reached, i.e., in response to a time difference from a region update time satisfying a target condition, a terminal acquires key information, where the key information includes a position of a current safe region, a position of a target safe region, and a position and orientation of a first virtual object. The terminal determines whether the first virtual object is positioned inside the current safe region, and when the first virtual object is positioned inside the current safe region, a region indication graphic is generated based on the position of the current safe region, the position of the target safe region, and the current position and orientation of the first virtual object. When the first virtual object is positioned outside the current safe region, a region indication graphic is generated based on the position of the current safe region, the position of the target safe region, a position closest to the first virtual object in the current safe region, and the orientation of the first virtual object, i.e., generating the region indication graphic by replacing the position of the first virtual object with an edge of the safe region closest to the first virtual object. The terminal displays the region indication graphic which synchronizes the position and orientation of the first virtual object in real time. The terminal cancels the displaying of the region indication graphic after a target duration.

With the technical solutions provided in the embodiments of the present disclosure, the terminal can display the region indication graphic in the virtual scene based on the current safe region, the safe region to be updated, and the first virtual object, where the region indication graphic can indicate the relative positional relationships between the first virtual object and the two safe regions. The user can know the relative positions between the first virtual object and the two safe regions by viewing the region indication graphic, without viewing the virtual map of the virtual scene, thereby realizing a high efficiency of human-computer interaction.

Figure 22:
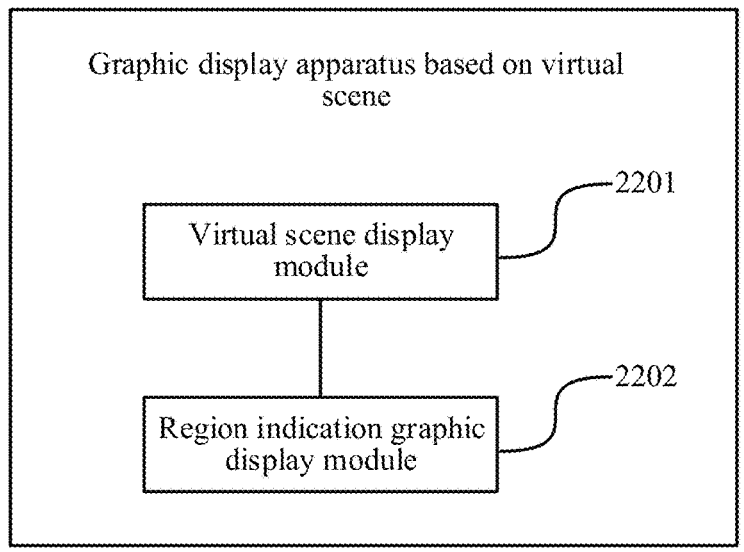
FIG. 22 is a schematic structural diagram of a graphic display apparatus based on a virtual scene according to an embodiment of the present disclosure.

FIG. 22 is a schematic structural diagram of a graphic display apparatus based on a virtual scene according to an embodiment of the present disclosure. Referring to FIG. 22, the apparatus includes: a virtual scene display module 2201 and a region indication graphic display module 2202.

The virtual scene display module 2201 is configured to display a view of a virtual scene from a perspective of a first virtual object, the virtual scene including a safe region, a virtual object positioned in the safe region having unchanged attribute values without receiving an interactive behavior.

The region indication graphic display module 2202 is configured to display a region indication graphic in the virtual scene based on the safe region, a target safe region, and the first virtual object, the region indication graphic indicating a relative positional relationship between the first virtual object and the current safe region and a relative positional relationship between the first virtual object and the target safe region, the target safe region being a region that replaces the current safe region in a next region update.

In one embodiment, the region indication graphic display module 2202 is configured to generate a region combination graphic based on the safe region and the target safe region, the region combination graphic indicating a relative positional relationship between the safe region and the target safe region; and display the region indication graphic based on the region combination graphic and the first virtual object.

In one embodiment, the region indication graphic display module 2202 is configured to generate the region combination graphic based on respective positions of the safe region and the target safe region in the virtual scene.

In one embodiment, the region indication graphic display module 2202 is configured to generate the region combination graphic based on a central position and a boundary position of the safe region in a virtual map of the virtual scene and a central position and a boundary position of the target safe region in the virtual map.

In one embodiment, the region indication graphic display module 2202 is configured to add an oriented icon of the first virtual object to the region combination graphic based on a position and orientation of the first virtual object in the virtual scene to obtain the region indication graphic; and display the region indication graphic.

In one embodiment, the region indication graphic display module 2202 is configured to perform:

In response to that the first virtual object is positioned inside the safe region, add the oriented icon inside the region combination graphic based on a distance and position relationship between the first virtual object and the central position of the safe region, and adjust a pointing direction of the oriented icon to the orientation of the first virtual object, so as to obtain the region indication graphic.

In response to that the first virtual object is positioned outside the safe region, determine a candidate position closest to the first virtual object on the boundary of the safe region in the region combination graphic based on a line between the first virtual object and the central position of the safe region, add the oriented icon to the candidate position, and adjust the pointing direction of the oriented icon to the orientation of the first virtual object, so as to obtain the region indication graphic.

In one embodiment, the region indication graphic display module 2202 is configured to rotate the region indication graphic to display the rotated region indication graphic.

In one embodiment, the region indication graphic includes an oriented icon indicating a position and orientation of the first virtual object in the virtual scene, and the region indication graphic display module 2202 is configured to perform any of the following:

Rotate the region indication graphic based on a position of the oriented icon on the region indication graphic to position the oriented icon at the bottom of the region indication graphic.

Rotate the region indication graphic based on a position and pointing direction of the oriented icon on the region indication graphic, to make a direction of the oriented icon point to a target direction.

In one embodiment, the region indication graphic includes a region combination graphic and an oriented icon, the region combination graphic indicating a relative positional relationship between the safe region and the target safe region, the oriented icon indicating a position and orientation of the first virtual object in the virtual scene, and the region combination graphic including a first region graphic corresponding to the safe region and a second region graphic corresponding to the target safe region, and the region indication graphic display module 2202 is configured to display the first region graphic, the second region graphic, and the oriented icon in different colors.

In one embodiment, the region indication graphic display module 2202 is configured to generate the region combination graphic based on a position of the safe region in the virtual scene, a distance between a central position of the safe region and the first virtual object, and a position of the target safe region in the virtual scene.

In one embodiment, the apparatus further includes the following module.

An adjustment module is configured to adjust the region indication graphic based on a current position and orientation of the first virtual object in the virtual scene in response to a change in any of the position and orientation of the first virtual object in the virtual scene.

In one embodiment, the apparatus further includes the following module.

A countdown icon display module is configured to display a countdown icon based on the region indication graphic, the countdown icon indicating a remaining time before an update from the safe region to the target safe region.

In one embodiment, the countdown icon display module is configured to perform any of the following:

Display the countdown icon below the region indication graphic.

In response to that the region indication graphic includes an oriented icon, display the countdown icon below the oriented icon, the oriented icon indicating the position and orientation of the first virtual object in the virtual scene.

In one embodiment, the target safe region is positioned inside the safe region, the target safe region has a smaller area than the safe region, or the target safe region has overlapping portions with the safe region.

In one embodiment, the apparatus further includes a distance display module configured to perform any of the following:

In response to that the first virtual object is positioned inside the safe region, display a distance between the first virtual object and the target safe region in the region indication graphic.

In response to that the first virtual object is positioned outside the safe region, display a distance between the first virtual object and the safe region and the distance between the first virtual object and the target safe region in the region indication graphic.

In one embodiment, the region indication graphic display module 2202 is further configured to cancel the displaying of the region indication graphic after a target duration.

It is to be understood that the graphic display apparatus based on a virtual scene provided in the embodiment above, when displaying a graphic, merely takes the above division of functional modules as an example for illustration. In practical application, the above functionalities may be allocated to be completed by different functional modules according to requirements, i.e., the internal structure of a computer device may be partitioned into different functional modules so as to complete all or part of the functionalities described above. In addition, the graphic display apparatus based on a virtual scene provided in the embodiment above falls within the same concept as that of the embodiment of the graphic display method based on a virtual scene, and the implementation process thereof is detailed in the embodiment of the method, which will not be detailed here.

With the technical solutions provided in the embodiments of the present disclosure, the region indication graphic can be displayed in the virtual scene based on the current safe region, the safe region to be updated, and the first virtual object, where the region indication graphic can indicate the relative positional relationships between the first virtual object and the two safe regions. The user can know the relative positions between the first virtual object and the two safe regions by viewing the region indication graphic, without viewing the virtual map of the virtual scene, thereby realizing a high efficiency of human-computer interaction.

An embodiment of the present disclosure provides a computer device, the computer device including one or more processors and one or more memories storing at least one computer program therein, the computer program being loaded and executed by the one or more processors to implement the following operations:

Display a view of a virtual scene from a perspective of a first virtual object, the virtual scene including a safe region, a virtual object positioned in the safe region having unchanged attribute values without receiving an interactive behavior.

Display a region indication graphic based on a current safe region, a target safe region, and the first virtual object, the region indication graphic indicating a relative positional relationship between the first virtual object and the current safe region and a relative positional relationship between the first virtual object and the target safe region, the target safe region being a region that replaces the current safe region in a next region update.

In one embodiment, the computer program is loaded and executed by the one or more processors to implement the following operations:

Generate a region combination graphic based on the safe region and the target safe region, the region combination graphic indicating a relative positional relationship between the safe region and the target safe region.

Display the region indication graphic based on the region combination graphic and the first virtual object.

In one embodiment, the computer program is loaded and executed by the one or more processors to implement the following operation:

Generate the region combination graphic based on respective positions of the safe region and the target safe region in the virtual scene.

In one embodiment, the computer program is loaded and executed by the one or more processors to implement the following operation:

Generate the region combination graphic based on a central position and a boundary position of the safe region in a virtual map of the virtual scene and a central position and a boundary position of the target safe region in the virtual map.

In one embodiment, the computer program is loaded and executed by the one or more processors to implement the following operations:

Add an oriented icon of the first virtual object to the region combination graphic based on a position and orientation of the first virtual object in the virtual scene to obtain the region indication graphic.

Display the region indication graphic.

In one embodiment, the computer program is loaded and executed by the one or more processors to implement any of the following operations:

In response to that the first virtual object is positioned inside the safe region, add the oriented icon inside the region combination graphic based on a distance and position relationship between the first virtual object and the central position of the safe region, and adjust a pointing direction of the oriented icon to the orientation of the first virtual object, so as to obtain the region indication graphic.

In response to that the first virtual object is positioned outside the safe region, determine a candidate position closest to the first virtual object on the boundary of the safe region on the region combination graphic based on a line between the first virtual object and the central position of the safe region, add the oriented icon to the candidate position, and adjust the pointing direction of the oriented icon to the orientation of the first virtual object, so as to obtain the region indication graphic.

In one embodiment, the computer program is loaded and executed by the one or more processors to implement the following operation:

Rotate the region indication graphic to display the rotated region indication graphic.

In one embodiment, the region indication graphic includes an oriented icon indicating a position and orientation of the first virtual object in the virtual scene, and the computer program is loaded and executed by the one or more processors to implement any of the following operations:

Rotate the region indication graphic based on a position of the oriented icon on the region indication graphic, so that the oriented icon is positioned at the bottom of the region indication graphic and the rotated region indication graphic is displayed.

Rotate the region indication graphic based on a position and pointing direction of the oriented icon on the region indication graphic, so that a direction of the oriented icon points to a target direction and the rotated region indication graphic is displayed.

In one embodiment, the region indication graphic includes a region combination graphic and an oriented icon, the region combination graphic indicating a relative positional relationship between the safe region and the target safe region, the oriented icon indicating a position and orientation of the first virtual object in the virtual scene, and the region combination graphic including a first region graphic corresponding to the safe region and a second region graphic corresponding to the target safe region, and the computer program is loaded and executed by the one or more processors to implement the following operation:

Display the first region graphic, the second region graphic, and the oriented icon in different colors.

In one embodiment, the computer program is loaded and executed by the one or more processors to implement the following operation:

Generate the region combination graphic based on a position of the safe region in the virtual scene, a distance between a central position of the safe region and the first virtual object, and a position of the target safe region in the virtual scene.

In one embodiment, the computer program is loaded and executed by the one or more processors to implement the following operation:

Adjust the region indication graphic based on a current position and orientation of the first virtual object in the virtual scene in response to a change in any of the position and orientation of the first virtual object in the virtual scene.

In one embodiment, the computer program is loaded and executed by the one or more processors to implement the following operation:

Display a countdown icon based on the region indication graphic, the countdown icon indicating a remaining time before the next region update from the safe region to the target safe region.

In one embodiment, the computer program is loaded and executed by the one or more processors to implement any of the following operations:

Display the countdown icon below the region indication graphic.

In response to that the region indication graphic includes an oriented icon, display the countdown icon below the oriented icon, the oriented icon indicating the position and orientation of the first virtual object in the virtual scene.

In one embodiment, the target safe region is positioned inside the safe region, the target safe region has a smaller area than the safe region, or the target safe region has overlapping portions with the safe region.

In one embodiment, the computer program is loaded and executed by the one or more processors to implement any of the following operations:

In response to that the first virtual object is positioned inside the safe region, display a distance between the first virtual object and the target safe region in the region indication graphic.

In response to that the first virtual object is positioned outside the safe region, display a distance between the first virtual object and the safe region and the distance between the first virtual object and the target safe region in the region indication graphic.

In one embodiment, the computer program is loaded and executed by the one or more processors to implement the following operation:

Cancel the displaying of the region indication graphic after a target duration.

In an exemplary embodiment, the computer device may be implemented as a terminal, the structure of which is described below.

Figure 23:
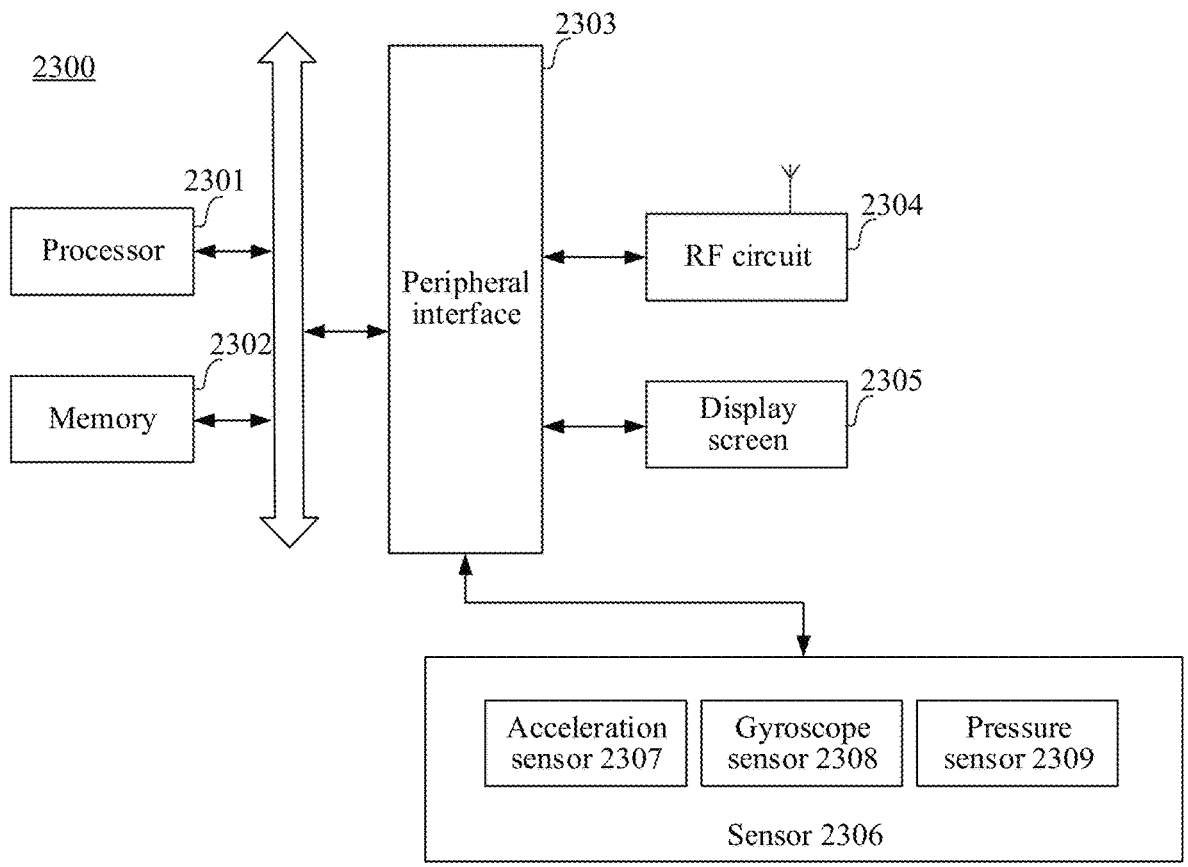
FIG. 23 is a schematic structural diagram of a terminal according to an embodiment of the present disclosure.

FIG. 23 is a schematic structural diagram of a terminal according to an embodiment of the present disclosure. The terminal 2300 may be: a smartphone, a tablet, a laptop, or a desktop. The terminal 2300 may also be referred to as another name such as user equipment, a portable terminal, a laptop terminal, or a desktop terminal.

Generally, the terminal 2300 includes: one or more processors 2301 and one or more memories 2302.

The processor 2301 may include one or more processing cores, for example, a 4-core processor or an 8-core processor. The processor 2301 may be implemented in at least one hardware form of DSP (Digital Signal Processing), FPGA (Field-Programmable Gate Array), and PLA (Programmable Logic Array). The processor 2301 may also include a main processor and a co-processor, where the main processor is a processor for processing data in a wake-up state, also referred to as a CPU (Central Processing Unit), and the co-processor is a low-power processor for processing data in a standby state. In some embodiments, the processor 2301 may be integrated with a GPU (Graphics Processing Unit), the GPU being responsible for rendering and drawing the content to be displayed on the display screen. In some embodiments, the processor 2301 may further include an AI (Artificial Intelligence) processor. The AI processor is configured to process computing operations related to machine learning.

The memory 2302 may include one or more computer-readable storage media. The computer-readable storage medium may be non-transitory. The memory 2302 may further include a high-speed random access memory and a nonvolatile memory, such as one or more disk storage devices or flash storage devices. In some embodiments, the non-transitory computer-readable storage media in the memory 2302 are used for storing at least one computer program for execution by the processor 2301 to implement the graphic display method based on a virtual scene provided by the embodiment of the method in the present disclosure.

In some embodiments, the terminal 2300 may also include: a peripheral interface 2303 and at least one peripheral. The processor 2301, the memory 2302, and the peripheral interface 2303 may be connected by a bus or a signal line. The peripherals may be connected to the peripheral interface 2303 through a bus, a signal line, or a circuit board. Specifically, the peripherals include: at least one of a radio frequency (RF) circuit 2304 or a display screen 2305.

The peripheral interface 2303 may be configured to connect the at least one peripheral related to I/O (input/output) to the processor 2301 and the memory 2302. In some embodiments, the processor 2301, the memory 2302, and the peripheral interface 2303 are integrated onto the same chip or circuit board. In some other embodiments, any one or two of the processor 2301, the memory 2302, and the peripheral interface 2303 may be implemented on a separate chip or circuit board, which is not limited in the embodiment.

The RF circuit 2304 is configured to receive and transmit an RF signal, also referred to as an electromagnetic signal. The RF circuit 2304 communicates with a communication network and other communication devices through the electromagnetic signal. The RF circuit 2304 converts an electrical signal into an electromagnetic signal for transmission, or converts a received electromagnetic signal into an electrical signal. In some embodiments, the RF circuit 2304 includes: an antenna system, an RF transceiver, one or more amplifiers, a tuner, an oscillator, a digital signal processor, a codec chipset, a user identity module card, etc.

The display screen 2305 is configured to display a UI (user interface). The UI may include graphics, text, oriented icons, video, and any combination thereof. When the display screen 2305 is a touch display screen, the display screen 2305 is further capable of collecting touch signals on or above the surface of the display screen 2305. The touch signal may be inputted to the processor 2301 as a control signal for processing. At this point, the display screen 2305 may be further configured to provide a virtual button and/or a virtual keyboard, also referred to as a soft button and/or a soft keyboard.

In some embodiments, the terminal 2300 further includes one or more sensors 2306. The one or more sensors 2306 include but are not limited to: an acceleration sensor 2307, a gyroscope sensor 2308, and a pressure sensor 2309.

The acceleration sensor 2307 can detect the magnitude of acceleration on three coordinate axes of the coordinate system established by the terminal 2300.

The gyroscope sensor 2308 can detect the body direction and rotation angle of the terminal 2300, and the gyroscope sensor 2308 can collect the 3D actions of the user on the terminal 2300 in cooperation with the acceleration sensor 2307.

The pressure sensor 2309 may be disposed at the side frame of the terminal 2300 and/or underneath the display screen 2305. When the pressure sensor 2309 is disposed at the side frame of the terminal 2300, a grip signal of the user on the terminal 2300 can be detected, and the processor 2301 performs left/right hand recognition or shortcut actions based on the grip signal collected by the pressure sensor 2309. When the pressure sensor 2309 is disposed underneath the display screen 2305, the processor 2301 controls operable controls on the UI interface based on the pressure of the user on the display screen 2305.

A person skilled in the art will understand that the structure shown in FIG. 23 constitutes no limitation on the terminal 2300, and the terminal may include more or fewer components than shown, or some components may be combined, or a different component arrangement may be used.

In an exemplary embodiment, a computer-readable storage medium is further provided, such as a memory including a computer program executable by a processor to perform the graphic display method based on a virtual scene in the embodiment above. For example, the computer-readable storage medium may be a read-only memory (ROM), a random access memory (RAM), a compact disc read-only memory (CD-ROM), a magnetic tape, a floppy disk, an optical data storage device, etc.

In an exemplary embodiment, a computer program product or computer program is further provided, the computer program product or computer program including program code stored in a computer-readable storage medium, the program code, when read by a processor of a computer device from the computer-readable storage medium and executed by the processor, causing the computer device to perform the graphic display method based on a virtual scene above.

In some embodiments, the computer program involved in the embodiment of the present disclosure may be deployed to be executed on one computer device, or on a plurality of computer devices positioned at one site, or on a plurality of computer devices distributed at a plurality of sites and interconnected through a communication network, where the plurality of computer devices distributed at the plurality of sites and interconnected through the communication network may form a block chain system.

A person of ordinary skill in the art will understand that all or some of the steps of the embodiments above may be implemented by hardware, or may be implemented by a program instructing relevant hardware. The program may be stored in a computer-readable storage medium. The storage medium described above may be a read-only memory, a magnetic disk, an optical disc, and the like.

While the embodiments above are merely example embodiments of the present disclosure, they are not intended to limit the present disclosure. Any modification, equivalent replacement, or improvement made within the spirit and principle of the present disclosure shall fall within the protection scope of the present disclosure.

What is claimed is:

1. A graphic display method based on a virtual scene, performed by a computer device, the method comprising:
    displaying a view of a virtual scene from a perspective of a first virtual object, the virtual scene comprising a safe region, wherein a virtual object positioned outside the safe region endures a change of an attribute value; and
    determining a region indication graphic based on a current safe region, a target safe region, and the first virtual object, and rotating the region indication graphic to display the rotated region indication graphic, the region indication graphic indicating a relative positional relationship between the first virtual object and the current safe region and a relative positional relationship between the first virtual object and the target safe region, the target safe region being a region that replaces the current safe region in a next region update,
    wherein the region indication graphic comprises an oriented icon indicating a position and an orientation of the first virtual object in the virtual scene, and the rotating the region indication graphic comprises:
        rotating the region indication graphic based on a position of the oriented icon on the region indication graphic to position the oriented icon at a bottom of the region indication graphic; or
        rotating the region indication graphic based on a position and pointing direction of the oriented icon on the region indication graphic to make a direction of the oriented icon point to a target direction.

2. The method according to claim 1, wherein the determining a region indication graphic based on a current safe region, a target safe region, and the first virtual object comprises:
    generating a region combination graphic based on the safe region and the target safe region, the region combination graphic indicating a relative positional relationship between the safe region and the target safe region; and
    determining the region indication graphic based on the region combination graphic and a location of the first virtual object.

3. The method according to claim 2, wherein the generating a region combination graphic based on the safe region and the target safe region comprises:
    generating the region combination graphic based on respective positions of the safe region and the target safe region in the virtual scene.

4. The method according to claim 3, wherein the generating the region combination graphic based on respective positions of the safe region and the target safe region in the virtual scene comprises:
    generating the region combination graphic based on a central position and a boundary position of the safe region in a virtual map of the virtual scene and a central position and a boundary position of the target safe region in the virtual map.

5. The method according to claim 2, wherein the generating a region combination graphic based on the safe region and the target safe region comprises:
    generating the region combination graphic based on a position of the safe region in the virtual scene, a distance between a central position of the safe region and the first virtual object, and a position of the target safe region in the virtual scene.

6. The method according to claim 1, wherein the oriented icon of the first virtual object is obtained by:
    in response to that the first virtual object 1s positioned inside the safe region, adding the oriented icon inside the region combination graphic based on a distance and position relationship between the first virtual object and the central position of the safe region, and adjusting a pointing direction of the oriented icon to the orientation of the first virtual object, to obtain the region indication graphic; and
    in response to that the first virtual object is positioned outside the safe region, determining a candidate position closest to the first virtual object on the boundary of the safe region on the region combination graphic based on a line between the first virtual object and the central position of the safe region, adding the oriented icon to the candidate position, and adjusting the pointing direction of the oriented icon to the orientation of the first virtual object, to obtain the region indication graphic.

7. The method according to claim 1, wherein the region indication graphic comprises a region combination graphic and an oriented icon, the region combination graphic indicating a relative positional relationship between the safe region and the target safe region, the oriented icon indicating a position and an orientation of the first virtual object in the virtual scene, and the region combination graphic comprising a first region graphic corresponding to the safe region and a second region graphic corresponding to the target safe region, and the displaying the region indication graphic comprises:

displaying the first region graphic, the second region graphic, and the oriented icon in different colors.

8. The method according to claim 1, further comprising:
adjusting the region indication graphic based on a current position and a current orientation of the first virtual object in the virtual scene in response to a change in at least one of the position or the orientation of the first virtual object in the virtual scene.

9. The method according to claim 1, further comprising:
displaying a countdown icon based on the region indication graphic, the countdown icon indicating a remaining time before the next region update.

10. The method according to claim 9, wherein the displaying a countdown icon based on the region indication graphic comprises at least one of:
displaying the countdown icon below the region indication graphic; or
in response to that the region indication graphic comprises an oriented icon, displaying the countdown icon below the oriented icon, the oriented icon indicating a position and an orientation of the first virtual object in the virtual scene.

11. The method according to claim 1, wherein the target safe region is positioned inside the safe region and has a smaller area than the safe region, or the target safe region has an overlapping portion with the safe region.

12. The method according to claim 1, further comprising:
in response to that the first virtual object is positioned inside the safe region, displaying a distance between the first virtual object and the target safe region in the region indication graphic; and
in response to that the first virtual object is positioned outside the safe region, displaying a distance between the first virtual object and the safe region and the distance between the first virtual object and the target safe region in the region indication graphic.

13. The method according to claim 1, further comprising:
canceling the displaying of the region indication graphic after a target duration.

14. A graphic display apparatus based on a virtual scene, the apparatus comprising:
one or more processors and one or more memories storing at least one computer program therein, the computer program being loaded and executed by the one or more processors to implement:
displaying a view of a virtual scene from a perspective of a first virtual object, the virtual scene comprising a safe region, wherein a virtual object positioned outside the safe region endures a change of an attribute value; and
determining a region indication graphic based on a current safe region, a target safe region, and the first virtual object, and rotating the region indication graphic to display the rotated region indication graphic, the region indication graphic indicating a relative positional relationship between the first virtual object and the current safe region and a relative positional relationship between the first virtual object and the target safe region, the target safe region being a region that replaces the current safe region in a next region update,
wherein the region indication graphic comprises an oriented icon indicating a position and an orientation of the first virtual object in the virtual scene, and the rotating the region indication graphic comprises:
rotating the region indication graphic based on a position of the oriented icon on the region indication graphic to position the oriented icon at a bottom of the region indication graphic; or
rotating the region indication graphic based on a position and pointing direction of the oriented icon on the region indication graphic to make a direction of the oriented icon point to a target direction.

15. The apparatus according to claim 14, wherein the displaying a region indication graphic based on a current safe region, a target safe region, and the first virtual object comprises:
generating a region combination graphic based on the safe region and the target safe region, the region combination graphic indicating a relative positional relationship between the safe region and the target safe region; and
displaying the region indication graphic based on the region combination graphic and a location of the first virtual object.

16. The apparatus according to claim 15, wherein the generating a region combination graphic based on the safe region and the target safe region comprises:
generating the region combination graphic based on respective positions of the safe region and the target safe region in the virtual scene.

17. A non-transitory computer-readable storage medium storing at least one computer program therein, the computer program being loaded and executed by at least one processor to implement:
displaying a view of a virtual scene from a perspective of a first virtual object, the virtual scene comprising a safe region, wherein a virtual object positioned outside the safe region endures a change of an attribute value; and
determining a region indication graphic based on a current safe region, a target safe region, and the first virtual object, and rotating the region indication graphic to display the rotated region indication graphic, the region indication graphic indicating a relative positional relationship between the first virtual object and the current safe region and a relative positional relationship between the first virtual object and the target safe region, the target safe region being a region that replaces the current safe region in a next region update,
wherein the region indication graphic comprises an oriented icon indicating a position and an orientation of the first virtual object in the virtual scene, and the rotating the region indication graphic comprises:
rotating the region indication graphic based on a position of the oriented icon on the region indication graphic to position the oriented icon at a bottom of the region indication graphic; or
rotating the region indication graphic based on a position and pointing direction of the oriented icon on the region indication graphic to make a direction of the oriented icon point to a target direction.

* * * * *